United States Patent
Hirai et al.

(10) Patent No.: US 11,538,209 B2
(45) Date of Patent: Dec. 27, 2022

(54) INFORMATION PROCESSING SYSTEM, INFORMATION PROCESSING APPARATUS, AND RECORDING MEDIUM

(71) Applicants: Tomoko Hirai, Tokyo (JP); Shingo Takayanagi, Kanagawa (JP)

(72) Inventors: Tomoko Hirai, Tokyo (JP); Shingo Takayanagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 7 days.

(21) Appl. No.: 17/284,854

(22) PCT Filed: Nov. 15, 2019

(86) PCT No.: PCT/JP2019/044906
§ 371 (c)(1),
(2) Date: Apr. 13, 2021

(87) PCT Pub. No.: WO2020/101019
PCT Pub. Date: May 22, 2020

(65) Prior Publication Data
US 2021/0390746 A1 Dec. 16, 2021

(30) Foreign Application Priority Data

Nov. 16, 2018 (JP) .............................. JP2018-216044
Nov. 13, 2019 (JP) .............................. JP2019-205610

(51) Int. Cl.
*G06T 11/60* (2006.01)
*G03G 15/22* (2006.01)
*G06T 5/00* (2006.01)

(52) U.S. Cl.
CPC .............. *G06T 11/60* (2013.01); *G03G 15/22* (2013.01); *G06T 5/007* (2013.01)

(58) Field of Classification Search
CPC .......... G06T 11/60; G06T 5/007; G03G 15/22
See application file for complete search history.

(56) References Cited

U.S. PATENT DOCUMENTS 8,866,841 B1 * 10/2014 Distler .................... G06T 11/60
345/619
9,332,149 B2   5/2016 Hasegawa
(Continued)

FOREIGN PATENT DOCUMENTS

JP        2009-134762        6/2009
JP           4775067         9/2011
(Continued)

OTHER PUBLICATIONS

International Search Report dated Jan. 31, 2020 in PCT/JP2019/044906 filed on Nov. 15, 2019.
Japanese Office Action for 2019-205610 dated Jul. 12, 2022.

*Primary Examiner* — YuJang Tswei
(74) *Attorney, Agent, or Firm* — IPUSA, PLLC

(57) ABSTRACT

An information processing system is disclosed. The system includes a terminal apparatus, and an information processing apparatus. In the information processing apparatus, first image data are stored in a first storage device. Second image data are received from the terminal apparatus. Third image data representing a third image is generated for displaying a part of a second image represented by second image data in a region inside or outside a shape of an element included in a first image represented by the first image data. The third image data are output to an output apparatus. In the terminal apparatus, an input is received from a user. The second image data are stored in a second storage device. The second image data are sent to the information processing apparatus.

7 Claims, 34 Drawing Sheets

(56) References Cited

U.S. PATENT DOCUMENTS

| | | | |
|---|---|---|---|
| 2003/0043298 A1* | 3/2003 | Ohtsuki | H04N 21/44012 |
| | | | 348/584 |
| 2005/0141771 A1 | 6/2005 | Yamakado et al. | |
| 2007/0146389 A1* | 6/2007 | Distler | G06T 15/04 |
| | | | 345/629 |
| 2008/0068562 A1* | 3/2008 | Hirata | H04N 5/23206 |
| | | | 348/E5.042 |
| 2015/0033117 A1 | 1/2015 | Miyazawa et al. | |
| 2015/0055154 A1 | 2/2015 | Hasegawa | |
| 2015/0228093 A1* | 8/2015 | Miyasa | G06T 11/60 |
| | | | 382/131 |
| 2016/0005229 A1* | 1/2016 | Lee | G06T 11/60 |
| | | | 345/419 |
| 2016/0203582 A1* | 7/2016 | Nakai | G02B 27/0179 |
| | | | 345/682 |

FOREIGN PATENT DOCUMENTS

| | | |
|---|---|---|
| JP | 2015-041982 | 3/2015 |
| JP | 2018-087396 | 6/2018 |

* cited by examiner

[Fig. 3]

| CONTENT ID | CONTENT IMAGE DATA |
|---|---|
| 101 | Mt. Fuji.jpg |
| 102 | ...... |
| ... | ... |

210

[Fig. 5]
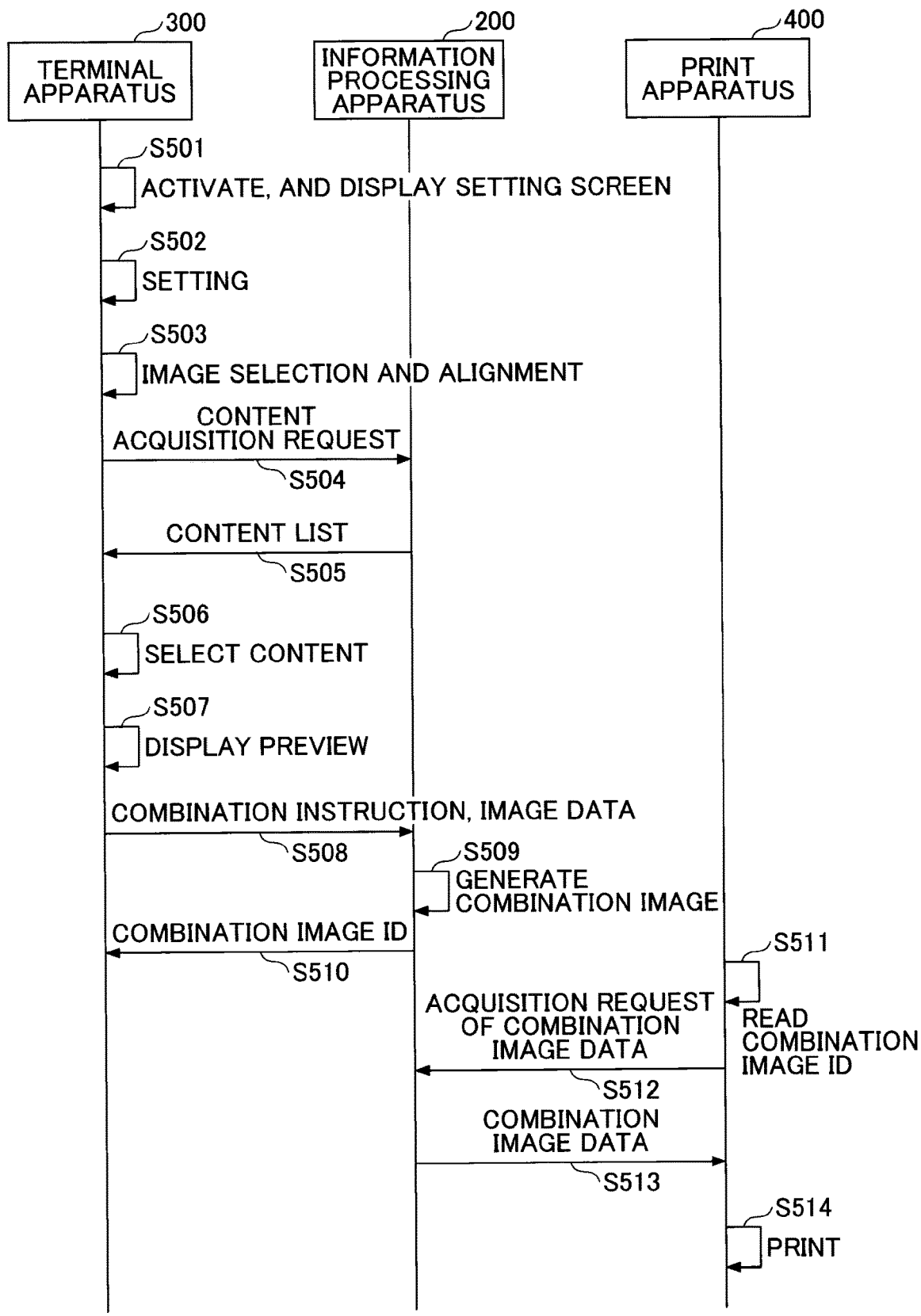

[Fig. 6]
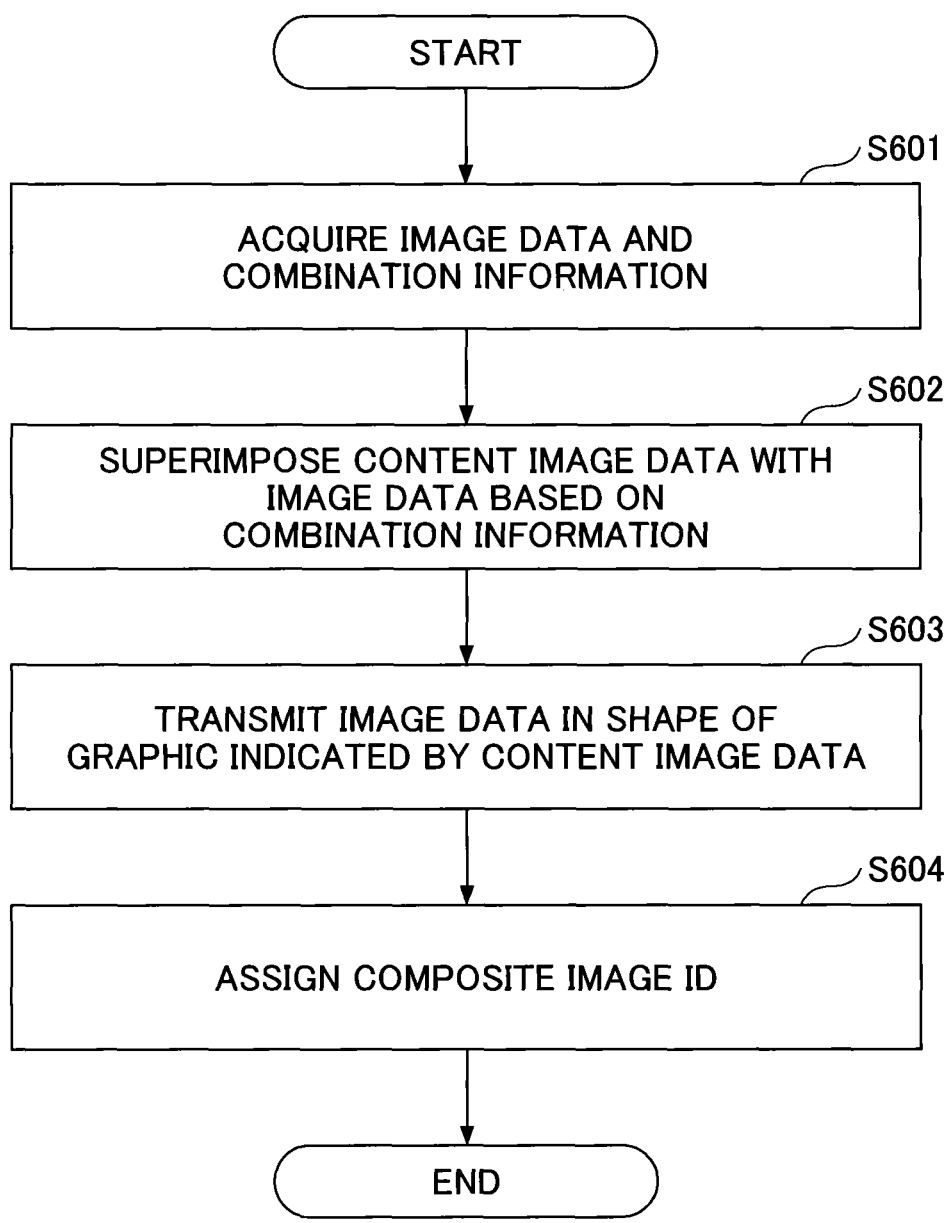

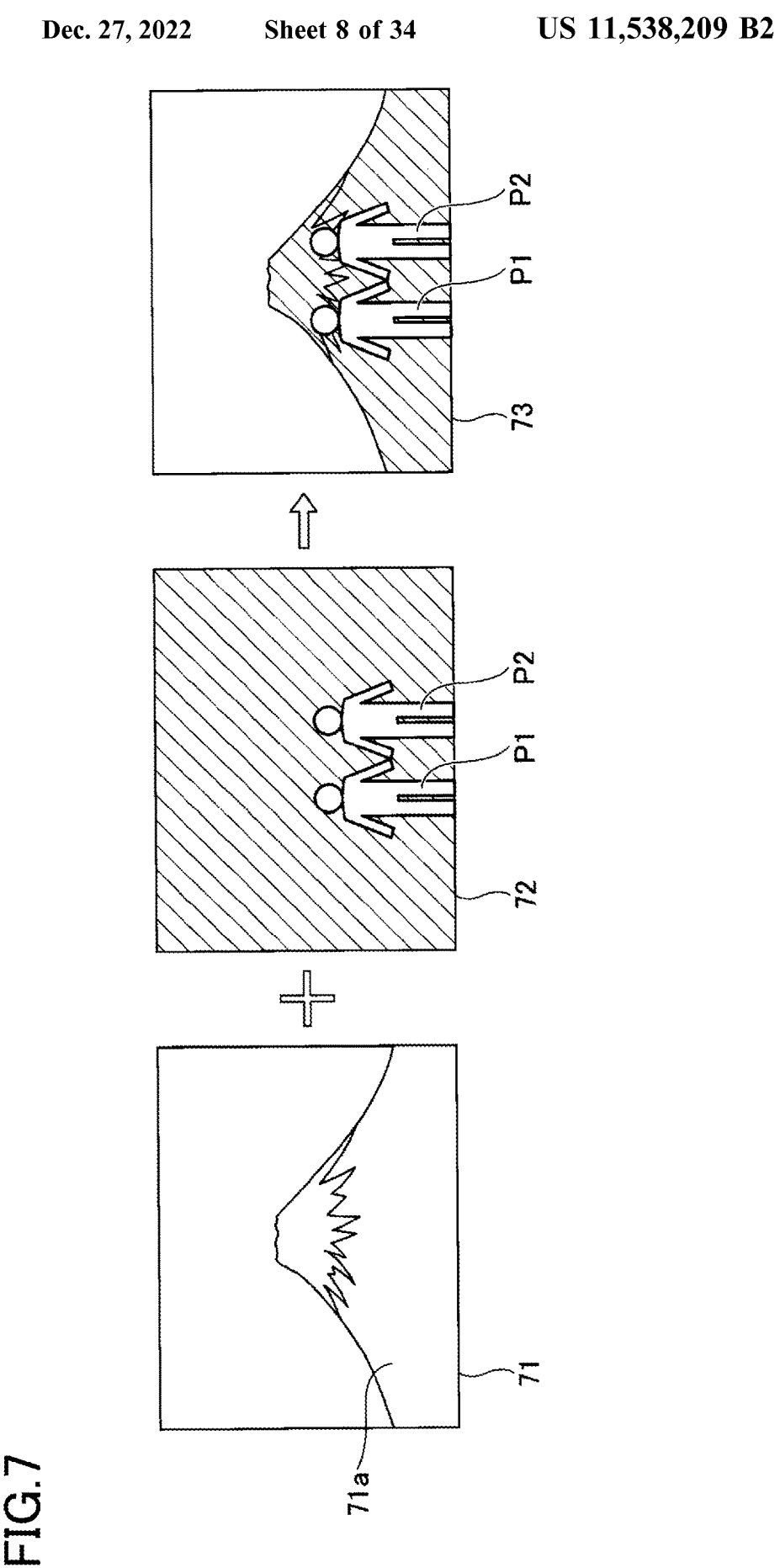

FIG.10A

| IMAGE ID | TYPE | IMAGE DATA | REGISTERED USER ID | PAID OR FREE | METADATA |
|---|---|---|---|---|---|
| 101 | CONTENT | Mt. Fuji.jpg | ×× | PAID | ..... |
| 102 | IMAGE | 2018.10.23.jpg | ○○ | FREE | ..... |
| ... | ... | ... | ... | ... | ... |

| IMAGE ID | TYPE | IMAGE DATA | REGISTERED USER ID | PAID OR FREE | METADATA | TRANSPARENCY |
|---|---|---|---|---|---|---|
| 101 | CONTENT | Mt. Fuji.jpg | ×× | PAID | ····· | YES |
| 102 | IMAGE | 2018.10.23.jpg | ○○ | FREE | ····· | NO |
| ··· | ··· | ··· | ··· | ··· | ··· | ··· |

| REGISTERED USE ID | IMAGE ID | FINANCIAL INFORMATION | BILLING COUNT |
|---|---|---|---|
| ×× | 101 | ..... | ..... |
| ... | ... | ... | ... |

240

[Fig. 12]
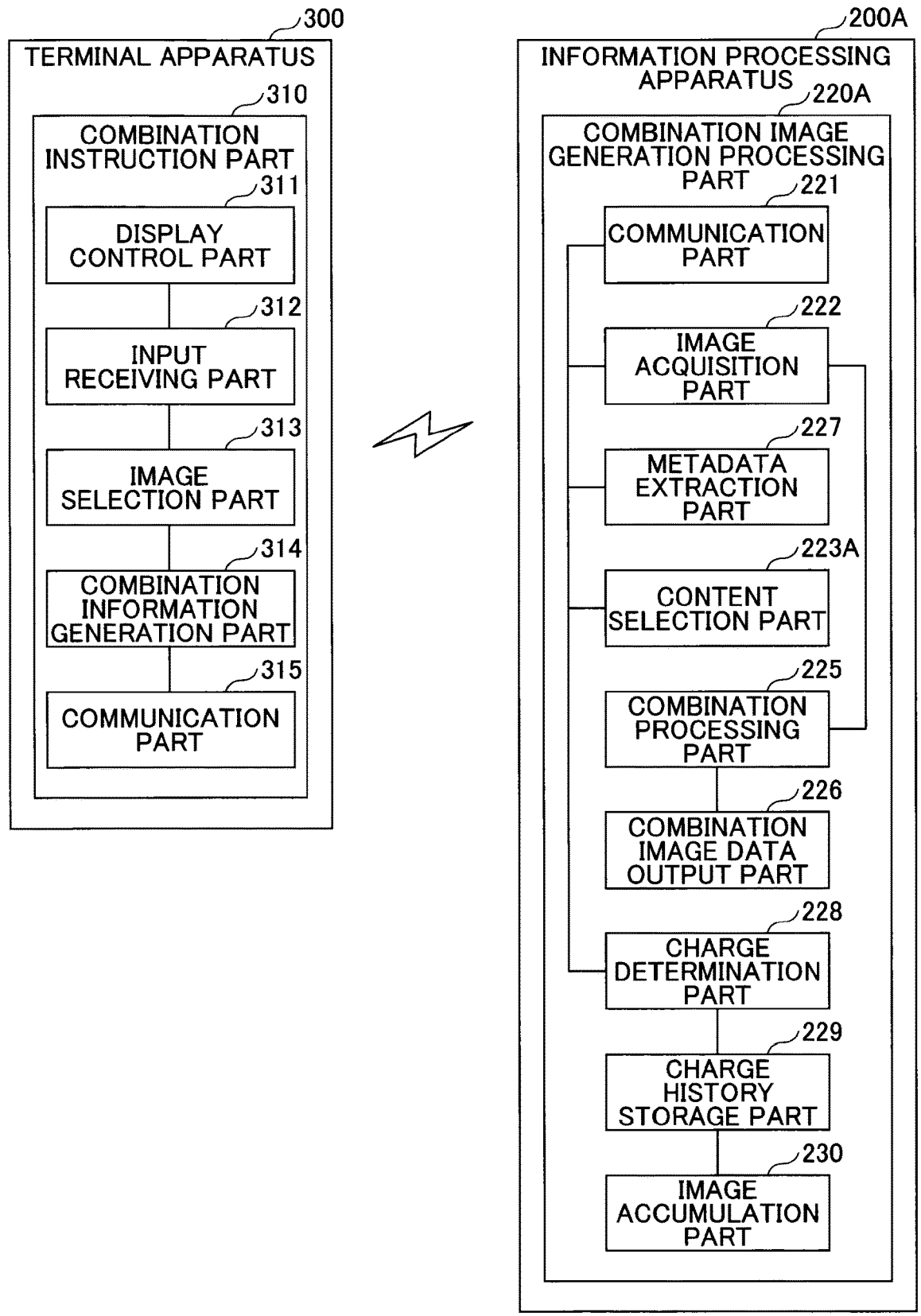

ABC

[Fig. 26B]

ABC

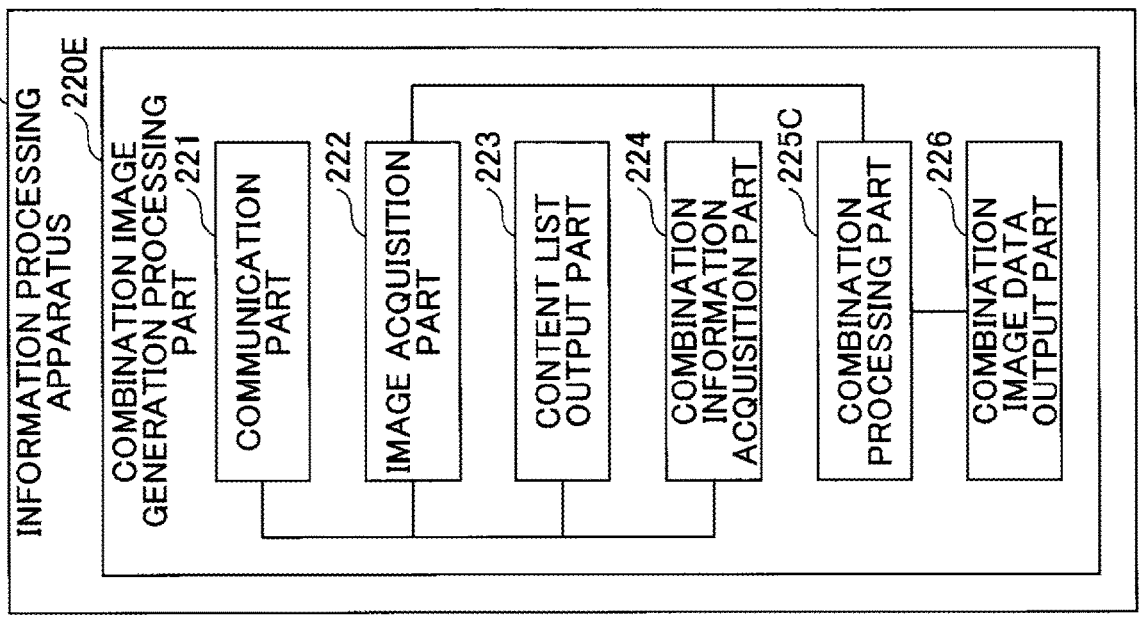
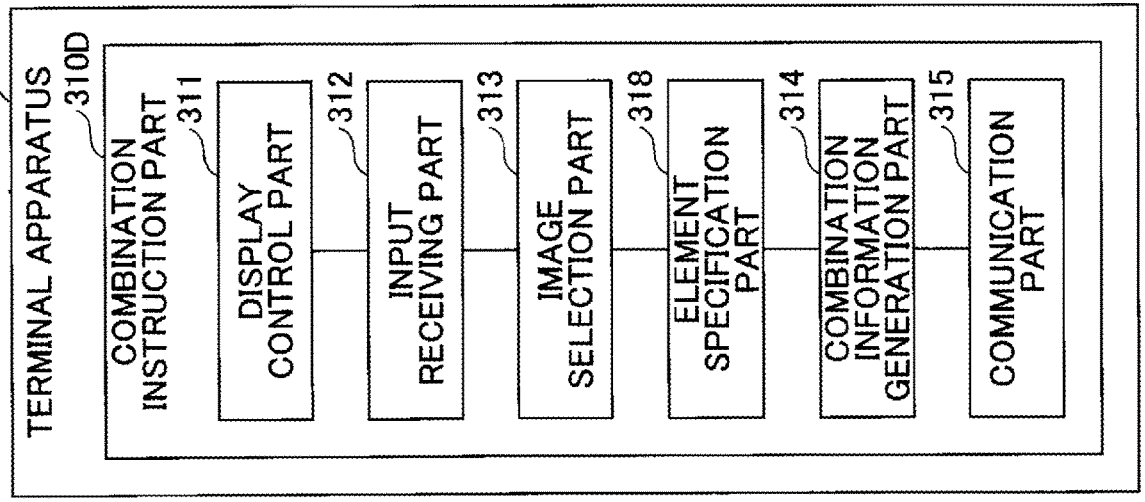
FIG.27

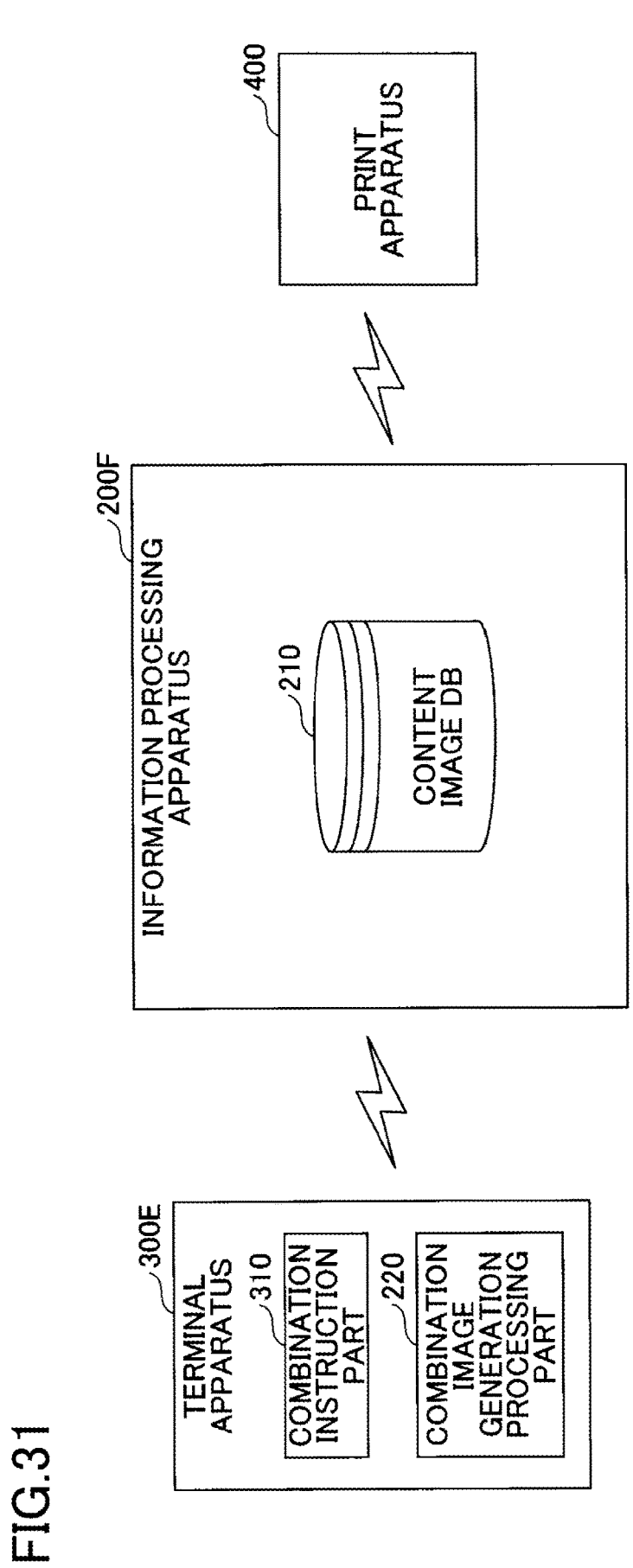

INFORMATION PROCESSING SYSTEM, INFORMATION PROCESSING APPARATUS, AND RECORDING MEDIUM

TECHNICAL FIELD

The present disclosure relates to an information processing system, an information processing apparatus, and a recording medium

BACKGROUND ART

Conventionally, it is known that a design is generated by laying out a plurality of digital contents registered in advance, and paid contents are included in a part of the digital contents (PTL 1).

CITATION LIST

Patent Literature

[PTL 1] Japanese Laid-Open Patent Publication No. 2009-134762

SUMMARY OF INVENTION

Technical Problem

In the technology described above, a plurality of contents are simply arranged along a layout, and it is difficult for a user to generate unique new contents.

Therefore, in view of such circumstances, the objective of the present disclosure is to allow a user to easily generate unique new content.

Solution to Problem

An aspect of the present disclosure provides an information processing system, including a terminal apparatus; and an information processing apparatus, wherein the information processing apparatus performs a first process including storing first image data in a first storage device, receiving second image data from the terminal apparatus, generating third image data representing a third image for displaying a part of a second image represented by second image data in a region inside or outside a shape of an element included in a first image represented by the first image data, and outputting the third image data to an output apparatus, and wherein the terminal apparatus performs a second process including receiving an input from a user, storing the second image data in a second storage device, and sending the second image data to the information processing apparatus.

BRIEF DESCRIPTION OF DRAWINGS

FIG. 3 is a diagram illustrating an example of a content image DB in the first embodiment.

FIG. 5 is a sequence diagram for explaining an operation of the information processing system in the first embodiment.

FIG. 6 is a diagram for explaining a combination image data generation process in the first embodiment.

FIG. 7 is a diagram illustrating generation of combination image data and combination information in the first embodiment.

FIG. 10A is a first diagram illustrating an example of an image DB in the second embodiment.

FIG. 10B is a second diagram illustrating an example of the image DB in the second embodiment.

FIG. 11 is a diagram illustrating an example of a user DB in the second embodiment.

FIG. 12 is a diagram illustrating functions of an information processing apparatus and a terminal apparatus in the second embodiment.

FIG. 26A is a diagram illustrating an editing example of a text image by an editing part in the fifth embodiment.

FIG. 26B is a diagram illustrating another editing examples of the text image by the editing part in the fifth embodiment.

FIG. 27 is a diagram illustrating functions of an information processing apparatus and a terminal apparatus in a sixth embodiment.

FIG. 31 is a diagram for explaining a modification of the information processing system in the sixth embodiment.

DESCRIPTION OF EMBODIMENTS

First Embodiment

Figure 1:
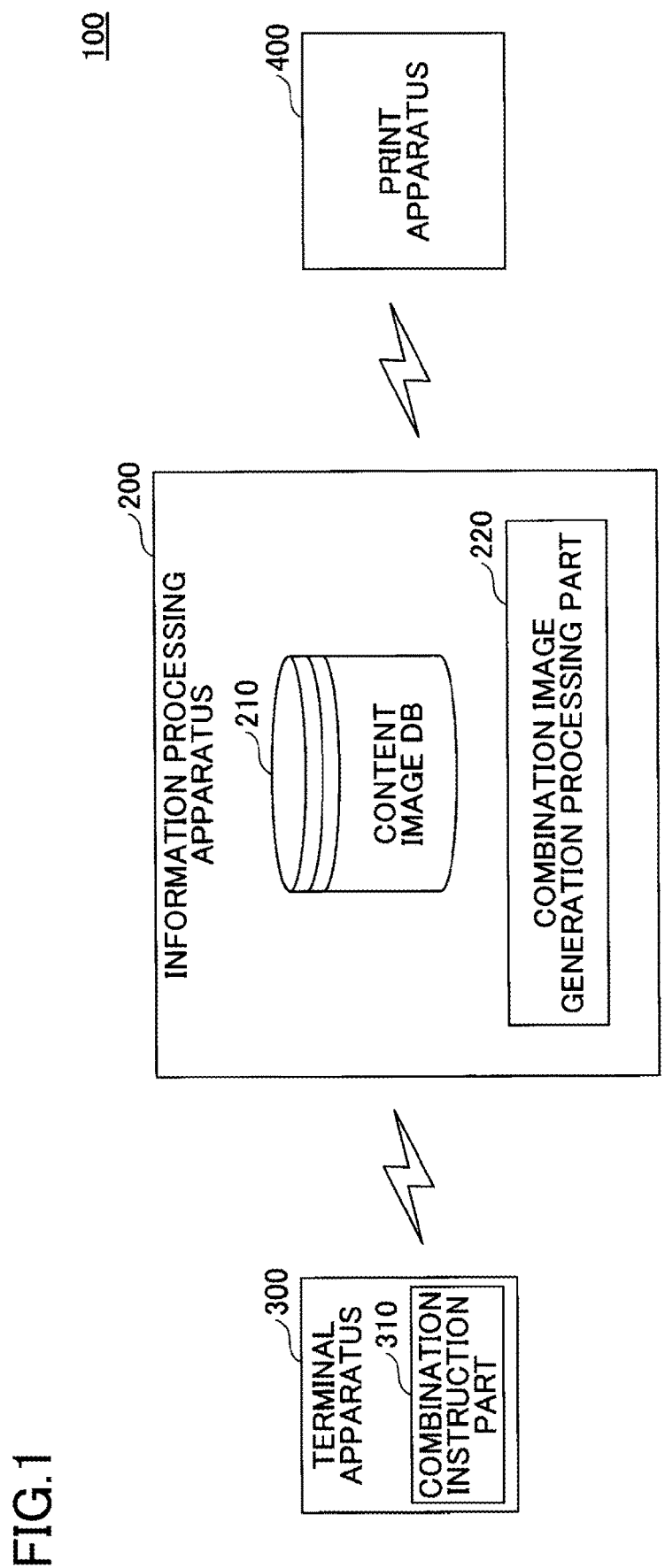
FIG. 1 is a diagram illustrating an information processing system in a first embodiment.

A first embodiment will be described below with reference to the drawings. FIG. 1 is a diagram illustrating an information processing system in the first embodiment.

The information processing system 100 in the first embodiment includes an information processing apparatus 200, a terminal apparatus 300, and a print apparatus 400, which are connected via a network or the like.

In an example of FIG. 1, the information processing system 100 includes, but is not limited to, the print apparatus 400. The information processing system 100 may include the information processing apparatus 200 and the terminal apparatus 300 without including the print apparatus 400. Also, the information processing apparatus 200 in the information processing system 100 may include all or a part of a configuration or functions of the terminal apparatus 300. Alternatively, the terminal apparatus 300 may include all or a part of a configuration or functions of the information processing apparatus 200.

In the information processing system 100 of the first embodiment, the information processing apparatus 200 includes a content image database (DB) 210 and a combination image generation processing part 220. The content image DB 210 stores image data representing content images.

In the following, the image data representing the content images are referred to as content image data. The content image may be an image of an existing character or an original character, an image of a landscape such as a mountain or a sea, an image of one or more letters for a name such as a place name, a competition name, or a building name, or the like.

The combination image generation processing part 220 generates combination image data obtained by combining image data received from the terminal apparatus 300 and the content image data.

The terminal apparatus 300 in the first embodiment includes a combination instruction part 310 and instructs the information processing apparatus 200 to generate combination image data.

In the information processing system 100, when the information processing apparatus 200 receives image data from the terminal apparatus 300, the information processing apparatus 200 sends a list of sets of content image data to be superimposed on the image data to the terminal apparatus 300.

Note that the image data received by the information processing apparatus 200 from the terminal apparatus 300 may be, for example, image data captured by an imaging device or the like included in the terminal apparatus 300, or image data held in the terminal apparatus 300.

That is, in the first embodiment, the content image data are image data stored in the information processing apparatus 200, and the image data are image data stored in the terminal apparatus 300.

For example, the content image data may be image data collected from another apparatus by the information processing apparatus 200 communicating with another apparatus via an Internet or the like. Also, the content image data may be uploaded from another apparatus via a network and stored in the information processing apparatus 200.

For example, the image data may be captured image data acquired by an imaging device included in the terminal apparatus 300. Also, the image data may be image data obtained by the terminal apparatus 300 communicating with another apparatus via the network, acquired from the other apparatus, and stored in the terminal apparatus 300.

When the content image data are selected at the terminal apparatus 300, the information processing apparatus 200 in the first embodiment generates combination image data by combining the received image data (first image data) and the content image data (second image data), and sends identification information for identifying the combination image data to the terminal apparatus 300.

Moreover, when the information processing apparatus 200 receives the identification information of the combination image data from the print apparatus 400, the information processing apparatus 200 sends the combination image data corresponding to the identification information to the print apparatus 400. Note that the identification information of the combination image data may be acquired by the print apparatus 400 through communication between the print apparatus 400 and the terminal apparatus 300, for example.

When receiving the combination image data, the print apparatus 400 outputs an image based on the combination image data to a recording medium. That is, the print apparatus 400 is regarded as an example of an output apparatus, which performs an image formation on a recording medium based on combination image data. In the first embodiment and other embodiments, for example, the recording medium may be a clothing fabric or a material other than cloth. The recording medium may be a medium capable of being processed into a flat fan or a folding fan, for example.

Furthermore, in the information processing system 100, an output destination of the combination image data from the information processing apparatus 200 is the print apparatus 400; however, the output destination is not limited to the print apparatus 400. The output destination of the combination image data may be output, for example, to a device, which performs embroidery or the like on a cloth according to the image data.

In the first embodiment, as described above, combination image data are generated and output based on the image data acquired from the terminal apparatus 300 and the selected content image data. Therefore, according to the first embodiment, it is possible to generate a new content image different from the content image stored in the content image DB 210.

Figure 2A:
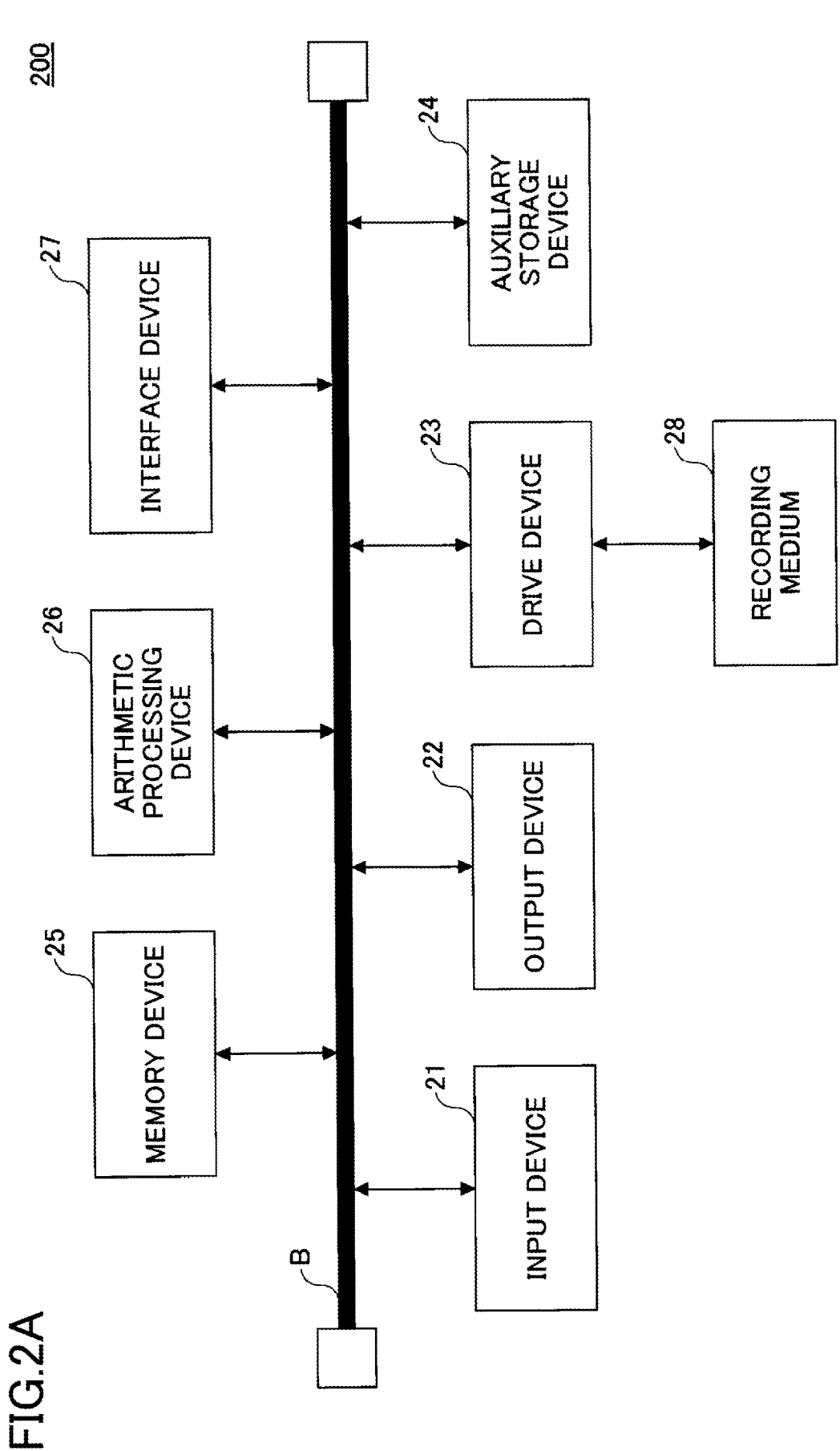
FIG. 2A is a diagram illustrating an example of a hardware configuration of an information processing apparatus in the first embodiment.

In the following, the information processing apparatus 200 in the first embodiment will be described. FIG. 2A is a diagram illustrating an example of a hardware configuration of the information processing apparatus.

The information processing apparatus 200 in the first embodiment includes an input device 21, an output device 22, a drive device 23, an auxiliary storage device 24, a memory device 25, an arithmetic processing device 26 as a processor, and an interface device 27, which are mutually connected to each other via a bus B.

The input device 21 is a device for inputting various information, and is realized by, for example, a keyboard or a pointing device. The output device 22 is a device for outputting various kinds of information items, and is realized by, for example, a display. The interface device 27 includes a LAN card or the like and is used for connecting to the network.

The information processing program in the first embodiment is at least a part of various programs, which control the information processing apparatus 200. The information processing program is provided by, for example, distribution of a recording medium 28 or downloading from the network. As the recording medium 28, on which the information processing program is recorded, any of various types of recording media may be used: a recording medium such as a CD-ROM, a flexible disk, a magneto-optical disk or the like for recording information optically, electrically or magnetically, a semiconductor memory such as a ROM, a flash memory, or the like for electrically recording data, and the like.

Moreover, the information processing program is installed in the auxiliary storage device 24 from the recording medium 28 via the drive device 23 when the recording medium 28, on which the information processing program is recorded, is set in the drive device 23. The information processing program downloaded from the network is installed in the auxiliary storage device 24 via the interface device 27.

The auxiliary storage device 24 stores the installed information processing program, and stores necessary files, data, and the like such as the above described databases. The memory device 25 reads and stores the information processing program from the auxiliary storage device 24 when the information processing apparatus 200 is activated. The arithmetic processing device 26 implements various processes as described later according to the information processing program stored in the memory device 25.

Figure 2B:
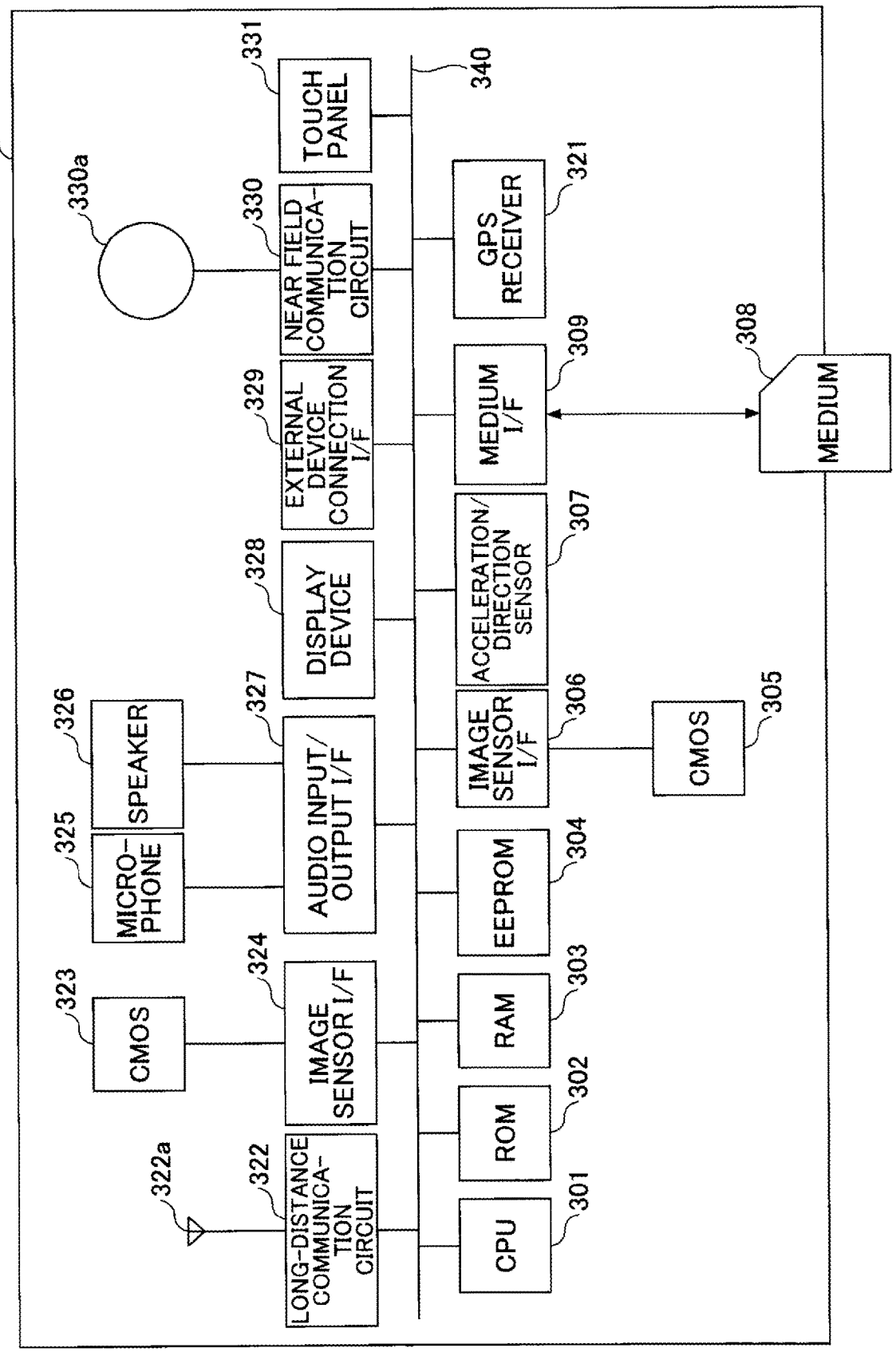
FIG. 2B is a diagram illustrating an example of a hardware configuration of a terminal apparatus in the first embodiment.

Next, referring to FIG. 2B, a hardware configuration of the terminal apparatus 300 will be described. FIG. 2B is a diagram illustrating an example of a hardware configuration of the terminal apparatus.

The terminal apparatus 300 in the first embodiment includes a Central Processing Unit (CPU) 301, a Read Only Memory (ROM) 302, a Random Access Memory (RAM) 303, an Electrically Erasable Programmable Read-Only Memory (EEPROM) 304, a Complementary Metal Oxide Semiconductor (CMOS) sensor 305, an image sensor interface (I/F) 306, an acceleration/direction sensor 307, a medium I/F 309, and a Global Positioning System (GPS) receiver 321.

Among these hardware components, the CPU 301 is an arithmetic processing device as a processor, which controls the overall operation of the terminal apparatus 300. The ROM 302 stores programs used for driving the CPU 301, a program such as an Initial Program Loader (IPL), and the like. The RAM 303 is used as a work area for the CPU 301. The EEPROM 304 reads or writes various data items such as a smartphone program under control of the CPU 301. The ROM 302, the RAM 303, and the EEPROM 304 are examples of the storage device of the terminal apparatus 300.

The CMOS sensor 305 is a built-in imaging unit, which captures a subject (mainly a self-portrait) under the control of the CPU 301, and obtains image data. Instead of the CMOS sensor 305, an imaging unit such as a Charge Coupled Device (CCD) sensor may be used.

The image sensor I/F 306 is a circuit, which controls driving of the CMOS sensor 305. The acceleration/direction sensor 307 may be any of various sensors such as an electronic magnetic compass, a gyrocompass, and an acceleration sensor, which detect geomagnetism. The media I/F 309 controls reading or writing (storing) of data with respect to a recording medium 308 (an example of a second storage device) such as a flash memory. The GPS receiver 321 receives GPS signals from GPS satellites.

Also, the terminal apparatus 300 includes a long-distance communication circuit 322, an antenna 322a of the long-distance communication circuit 322, a CMOS sensor 323, an image sensor I/F 324, a microphone 325, a speaker 326, an audio input/output I/F 327, a display device 328, and an external device connection I/F 329, a near field communication circuit 330, an antenna 330a of the near field communication circuit 330, and a touch panel 331.

Among these hardware components, the long-distance communication circuit 322 is a circuit, which communicates with other devices via a communication network. The CMOS sensor 323 is a kind of built-in imaging unit, which captures an image of a subject under the control of the CPU 301 and obtains image data. The image sensor I/F 324 is a circuit, which controls driving of the CMOS sensor 323. The microphone 325 is a built-in circuit, which converts audio into an electrical signal. The speaker 326 is a built-in circuit, which generates electric sounds such as music and voice by changing electrical signals into physical vibrations. The audio input/output I/F 327 is a circuit that processes an input and an output of an audio signal between the microphone 325 and the speaker 326 under the control of the CPU 301. The display device 328 is a kind of display part such as liquid crystal or organic Electro Luminescence (EL) that displays an image of a subject, various icons, and the like. The display device 328 is a kind of display part such as liquid crystal or organic EL (Electro Luminescence), which displays an image of a subject, various icons, and the like. The external device connection I/F 329 is an interface for connecting various external devices. The near field communication circuit 330 is a communication circuit such as Near Field Communication (NFC), Bluetooth (registered trademark), or the like. The touch panel 331 is a kind of an input part for operating the terminal apparatus 300 when a user presses the display device 328. The touch panel 331 is a kind of an input part for operating the terminal apparatus 300 when the user presses the display device 328. The display device 328 is an example of a display part included in the terminal apparatus 300.

In addition, the terminal apparatus 300 includes a bus line 340. The bus line 340 is an address bus or a data bus for electrically connecting each component such as the CPU 301.

Next, the content image DB 210 in the first embodiment will be described with reference to FIG. 3. In the first embodiment, the content image DB 210 is provided in the information processing apparatus 200. However, the first embodiment is not limited to this. The content image DB 210 may be provided in an apparatus different from the information processing apparatus 200.

FIG. 3 is a diagram illustrating an example of the content image DB in the first embodiment. The content image DB 210 in the first embodiment may be provided in the auxiliary storage device 24 (an example of a first storage device) or the like of the information processing apparatus 200, for example. Moreover, the content image DB 210 in the first embodiment may be prepared in advance.

The content image DB 210 in the first embodiment includes "CONTENT ID", and "CONTENT IMAGE DATA" as information items. In the content image DB 210, the content ID and the content image data are associated with each other.

A value of the item "CONTENT ID" indicates identification information for specifying content image data. A value of the item "CONTENT IMAGE DATA" is an entity of the content image data.

The content image data in the first embodiment may be collected from the Internet by the information processing apparatus 200, and may be stored in the content image DB 210 with a content ID assigned by the information processing apparatus 200, for example. Also, the information processing apparatus 200 may periodically perform processes for collecting content image data from the Internet and for assigning a content ID to the collected image data.

Moreover, the content image data may be sent from a specific server apparatus or the like to the information processing apparatus 200, and may be stored in the content image DB 210.

Next, functions of the information processing apparatus 200 and the terminal apparatus 300 in the first embodiment will be described with reference to FIG. 4.

Figure 4:
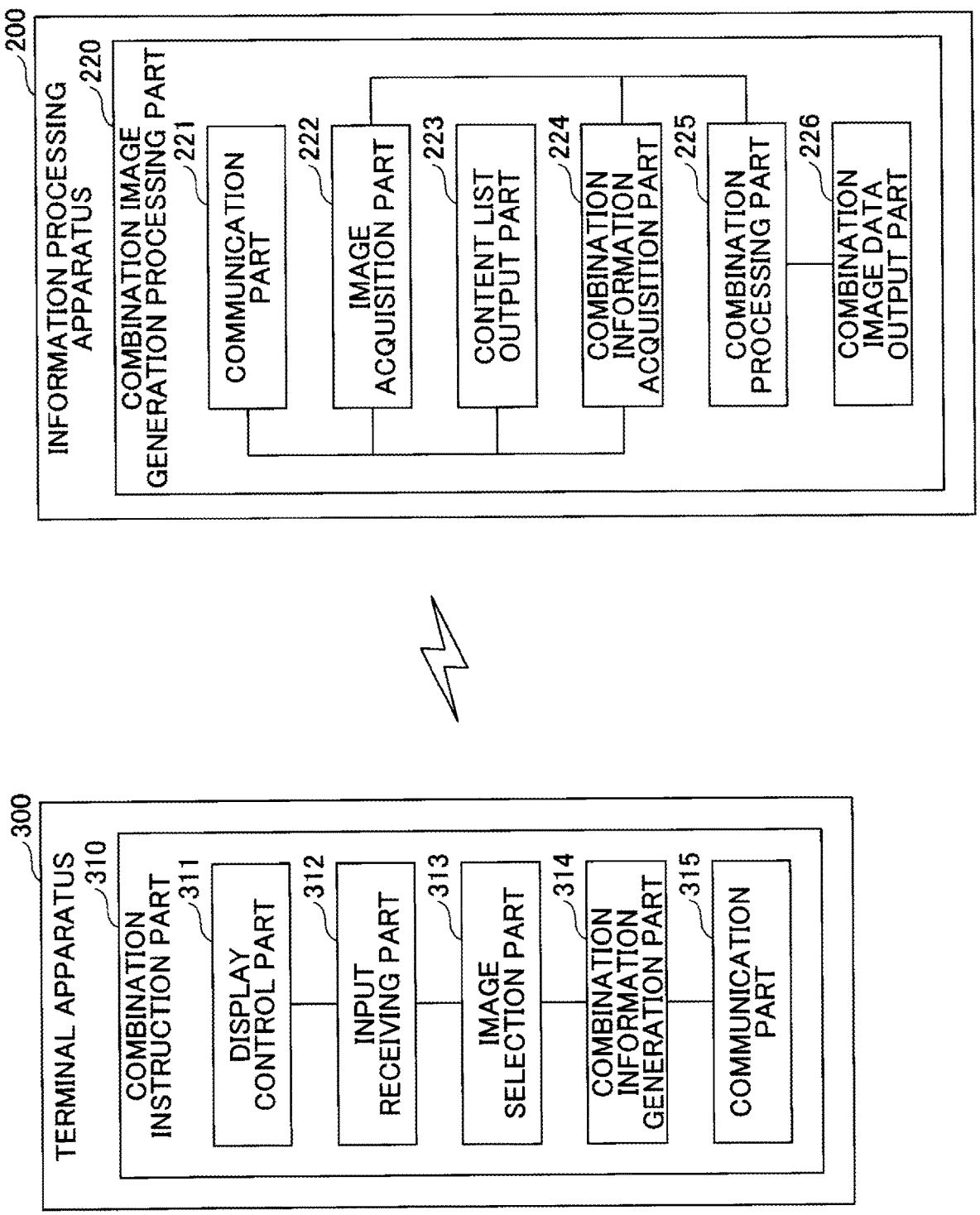
FIG. 4 is a diagram illustrating functions of the information processing apparatus and the terminal apparatus in the first embodiment.

FIG. 4 is a diagram illustrating functions of the information processing apparatus and the terminal apparatus in the first embodiment. First, functions of the information processing apparatus 200 will be described. The functions of the information processing apparatus 200 described below are realized by the arithmetic processing device 26 reading and executing a program stored in the memory device 25.

The combination image generation processing part 220 of the information processing apparatus 200 in the first embodiment includes a communication part 221, an image acquisition part 222, a content list output part 223, a combination information acquisition part 224, a combination processing part 225, and a combination image data output part 226.

The communication part 221 corresponds to an example of a first communication part, and performs sending and receiving data between the information processing apparatus 200 and an external apparatus. Specifically, the communication part 221 performs receiving image data from the terminal apparatus 300, sending combination image data to the print apparatus 400, and the like.

The image acquisition part 222 acquires the image data received by the communication part 221. The content list output part 223 outputs a list of sets of content image data stored in the content image DB 210 to the terminal apparatus 300.

The combination information acquisition part 224 acquires the combination information received by the communication part 221 from the terminal apparatus 300 together with the image data.

The combination processing part 225 generates combination image data using the image data, the combination information, and the content image data selected from the list output by the content list output part 223. Specifically, the combination processing part 225 generates combination image data (an example of third image data) representing a combination image (an example of a third image), whereby at least a part of an image represented by the image data is displayed in either an inner region or an outer region of the shape of an element included in the image represented by the content image data.

At this time, the combination processing part 225 assigns identification information for specifying the combination image data to the generated combination image data. Also, the combination image data generated by the combination processing part 225 may be temporarily retained in the auxiliary storage device 24 or the like.

The generation of the combination image data and details of the combination information will be described later.

The combination image data output part 226 corresponds to an example of an output part. When the combination image data output part 226 receives the identification information of the combination image data by the communication part 221, the combination image data output part 226 sends the communication image data corresponding to the identification information to the print apparatus 400.

Next, functions of the terminal apparatus 300 will be described. The terminal apparatus 300 includes a combination instruction part 310. The combination instruction part 310 is realized by the arithmetic processing device of the terminal apparatus 300 reading and executing a program stored in the memory device.

The combination instruction part 310 includes a display control part 311, an input receiving part 312, an image selection part 313, a combination information generation part 314, and a communication part 315.

The display control part 311 controls display on the terminal apparatus 300. Specifically, the display control part 311 causes the terminal apparatus 300 to display a list of sets of content image data and a content image, which is represented based on the content image data selected from the list. Also, the display control part 311 displays a preview of an image obtained by combining the content image and an image represented by the selected image data. At this time, the display control part 311 may display the preview, at which the image data are to be visible through the content image based on a shape extracted from the content image data.

The input receiving part 312 receives an input with respect to the terminal apparatus 300.

The image selection part 313 selects image data stored in the terminal apparatus 300 in response to the input received by the input receiving part 312.

The combination information generation part 314 generates information indicating a positional relationship when the content image displayed by the display control part 311 and the image represented by the selected image data are superimposed.

The communication part 315 corresponds to an example of a second communication part, and sends and receives information to and from the information processing apparatus 200 and the print apparatus 400. Specifically, for example, the communication part 315 sends the selected image data, combination information, and the like to the information processing apparatus 200.

Next, an operation of the information processing system 100 in the first embodiment will be described with reference to FIG. 5. FIG. 5 is a sequence diagram for explaining the operation of the information processing system in the first embodiment.

In the information processing system 100 in the first embodiment, when the terminal apparatus 300 receives an instruction to activate the terminal apparatus 300 from the user, the terminal apparatus 300 starts the combination instruction part 310, and causes the display control part 311 to display, on the display device 328 or the like, a setting screen pertinent to an image combination (step S501). Details of the setting screen will be described later.

Subsequently, the terminal apparatus 300 receives settings pertinent to a recording medium, on which the combination image is printed, on the displayed setting screen by the input receiving part 312 (step S502).

Specifically, for example, the terminal apparatus 300 receives settings such as selections of a shape of fabric, on which the combination image is formed (a shape of a T-shirt, a handbag, or the like), a type (material such as cloth, thick cloth, thin cloth, vinyl, or the like), a color (red, blue, yellow, amber, or the like), a size (S size, M size, L size, or the like). For example, selections of T-shirt, cloth, bag, and L are accepted as the shape, the type, the color, and the size of the fabric. Moreover, the display control part 311 may perform displaying on the display device 328 based on the settings received by the input receiving part 312.

Subsequently, the terminal apparatus 300 causes the display control part 311 to display a list of sets of image data stored in the terminal apparatus 300 on the terminal apparatus 300, and causes the image selection part 313 to identify the image data selected from the list (step S503). Note that the image data to be selected may be image data captured by the terminal apparatus 300.

When the image data is selected, the terminal apparatus 300 sends an acquisition request of a list of sets of content image data to the information processing apparatus 200 through the communication part 315 (step S504).

Upon receiving this acquisition request by the communication part 221, the information processing apparatus 200 sends a list of sets of content image data to the terminal apparatus 300 by the content list output part 223 (step S505).

Upon obtaining the list of sets of content image data, the terminal apparatus 300 causes the display control part 311 to display the received list, and causes the input receiving part 312 to receive a selection of content image data (step S506). The list of sets of content image data may be displayed in one of display areas included in a setting screen.

Upon selecting the content image data, the terminal apparatus 300 causes the display control part 311 to display a preview image, in which content image represented by the selected content image data and an image represented by the image data selected in step S503 are combined in accordance with user operations (step S507).

Specifically, the input receiving part 312 receives an input for changing a position of an image indicated by the image data, which are selected by the user in step S503, and adjusts and determines a position relative to an content image represented by the selected content image data.

When a positional relationship between the content image and the image is determined by the user, the terminal apparatus 300 causes the combination information generation part 314 to generate combination information including information indicating the positional relationship between the content image and the image, and sends the combination information to the information processing apparatus 200 together with the selected image data as a combination instruction (step S508).

In FIG. 5, after image data stored in the terminal apparatus 300 are selected, a list of sets of content image data is acquired and content image data are selected; however, a selection order of image data and content image data is not limited to this order.

In FIG. 5, a setting of a printing position of a fabric and a combination image is performed before the selection of the image data; however, a setting order is not limited to this order.

In this embodiment, for example, first, the list of sets of content image data may be acquired, and the content image data may be selected. Next, the image data stored in the terminal apparatus 300 may be selected. Finally, settings such as the printing position of the fabric and the combination image may be conducted. That is, in the first embodiment, these orders may be arbitrarily changed according to operations of the user.

Upon receiving the combination instruction and the image data from the terminal apparatus 300, the information processing apparatus 200 causes the combination processing part 225 to generate combination image data by superimposing the selected content image data and the selected image data based on the combination information (step S509). Details of step S509 will be described later.

Next, the information processing apparatus 200 sends identification information (combination image ID) of the combination image data assigned to the combination image data to the terminal apparatus 300 by the communication part 221 (step S510).

Next, in the information processing system 100, the print apparatus 400 reads the identification information of the combination image data from the terminal apparatus 300 (step S511). Upon reading the identification information, the print apparatus 400 sends the identification information to the information processing apparatus 200 (step S512).

Note that the print apparatus 400 may send the identification information to the information processing apparatus 200 in a case in which a recording medium (T-shirt or the like), on which the combination image is printed, has been purchased by the user of the terminal apparatus 300.

When the information processing apparatus 200 receives the identification information from the print apparatus 400, the information processing apparatus 200 sends the combination image data associated with the identification information to the print apparatus 400 by the combination image data output part 226 (step S513).

The print apparatus 400 outputs the combination image data to a prepared recording medium (step S514), and terminates the process.

In the first embodiment, in the terminal apparatus 300, the information set in step S502 may be retained in the information processing apparatus 200, and may be sent to the print apparatus 400 together with the combination image data. Alternatively, the information set in step S502 may be retained by the terminal apparatus 300, and may be read together with the identification information of the combination image data by the print apparatus 400.

The information set in step S502 includes a shape (T-shirt), a type, a color, a size, and a print position of the combination image on fabric, on which the combination image is formed.

In the first embodiment, the combination information and the combination image data are retained in the information processing apparatus 200; however, the first embodiment is not limited to this configuration. The information processing apparatus 200 may send the generated combination image data to the terminal apparatus 300 and may cause the terminal apparatus 300 to retain the generated combination image data. In this case, the terminal apparatus 300 may send the combination image data directly to the print apparatus 400.

Also, in the first embodiment, the preview image is displayed on the terminal apparatus 300, and the combination image data is generated by the information processing apparatus 200; however, an operation pertinent to generation of the combination image data is not limited to this operation. In the first embodiment, the combination image data may be generated by the terminal apparatus 300.

Next, a process of the combination processing part 225 in the first embodiment will be described with reference to FIG. 6. FIG. 6 is a diagram for explaining a combination image data generation process in the first embodiment. FIG. 6 depicts details of a process in step S509 of FIG. 5.

The combination image generation processing part 220 in the first embodiment acquires the image data received from the terminal apparatus 300 by the image acquisition part 222, and acquires the combination information received from the terminal apparatus 300 by the combination information acquisition part 224 (step S601).

Subsequently, the combination image generation processing part 220 causes the combination processing part 225 to superimpose an image represented by the selected content image data and an image represented by the image data so that a positional relationship indicated by the combination information is obtained (step S602). More specifically, the combination processing part 225 superimposes the image represented by the content image data on the image represented by the image data.

Subsequently, the combination processing part 225 identifies an element present in the content image, and sets a region indicating a shape of the identified element as a transparent region (step S603). The transparent region is a region, which is processed so that a lower layer image is able to be visually recognized. In the first embodiment, an image in this state is called a combination image, and image data representing the combination image is called combination image data.

Moreover, the shape of the element present in the content image is able to be extracted from the content image data, for example.

Subsequently, the combination processing part 225 assigns a combination image ID serving as the identification information for specifying the combination image data, to the combination image data generated in step S603 (step S604), and terminates this process. The combination image ID may be, for example, a two dimensional barcode or the like.

In the following, the process of the combination process part 225 will be further described with reference to FIG. 7. FIG. 7 is a diagram illustrating generation of the combination image data and the combination information in the first embodiment.

A content image 71 illustrated in FIG. 7 is an image represented by content image data selected from the list of sets of content image data, and an image 72 represents an image represented by the image data stored in the terminal apparatus 300. A combination image 73 depicted in FIG. 7 is an image obtained by combining the content image 71 and the image 72.

The content image 71 depicted in FIG. 7 includes an element 71*a*. In FIG. 7, the element 71*a* indicates a mountain shape, but the element extracted from the content image data may have any shape. Elements in the first embodiment may be, for example, letters and numerals, or any figures. In the first embodiment, there may be a plurality of elements extracted from the content image data.

In the first embodiment, when content image data representing the content image 71 is selected from the list of sets of content image data at the terminal apparatus 300, the combination instruction part 310 may display a preview image, in which the content image 71 is superimposed on the image 72, on the display device 328 of the terminal apparatus 300. At this time, the combination instruction part 310 may leave an outline of the element 71*a*, and may make the entire content image 71 a transparent image, so that the user is able to visually recognize a position of the element 71*a* in the image 72.

In the terminal apparatus 300, the position of the element 71*a* in the image 72 is determined by an operation of the user moving the content image 71 on the image 72, and the positional relationship between the content image 71 and the image 72 is determined.

In the combination image 73 depicted in FIG. 7, the positional relationship between the content image 71 and the image 72 is determined, so that images of the persons P1 and P2 present in the image 72 are included in the element 71*a*. In the terminal apparatus 300, when an operation for determining the positional relationship between the content image 71 and the image 72 is received, in that state, a region inside the element 71*a* in the content image 71 is made to be transparent and a region outside the element 71*a* is made not to be transparent (to be opaque). Then, the terminal apparatus 300 generates combination information indicating a positional relationship between the content image 71 and the image 72.

By performing the above described operations, it is possible to produce a combination image 73, in which the image 72 is cut out with the shape of the element 71*a*.

In the first embodiment, because the user of the terminal apparatus 300 is able to determine the positional relationship between the content image 71 and the image 72, it is possible to arrange a portion (region) desired by the user in the image 72 in the element 71*a*.

Therefore, for example, in a case in which the persons P1 and P2 travel to an area where there is a mountain indicated by the element 71*a*, and the image data of the image 72 is captured using an imaging function of the terminal apparatus 300 of the person P1 or the like, it is possible to generate the combination image 73, in which the image 72 and the element 71*a* are associated with each other.

More specifically, the person P1 activates the combination instruction part 310 in the terminal apparatus 300, selects image data representing the image 72, and selects content image data representing the content image 71 from the list of sets of content image data. Then, the content image 71 displayed on the image 72 may be moved to position a desired region in the image 72 inside the element 71*a*, and an operation for determining the positional relationship may be performed.

In response to this operation, the terminal apparatus 300 sends image data representing the image 72 and combination information to the information processing apparatus 200.

Regarding the combination information in the first embodiment, for example, a reference point may be defined with respect to each of the content image 71 and the image 72, and information, which indicates the positional relationship between coordinates of the reference point of the content image 71 and coordinates of the reference point of the image 72, may be obtained as the combination information.

In FIG. 7, an example, in which the content image 71 is moved on the image 72, has been described as a method for determining the positional relationship between the content image 71 and the image 72; however, the method is not limited to the above described method. In the first embodiment, for example, any one of the content image 71 and the image 72 may be rotated, enlarged, or reduced.

When the information processing apparatus 200 receives the image data representing the image 72 and the combination information, the information processing apparatus 200 acquires the content image data representing the content image 71 from the content image DB 210, and generates the combination image data representing the combination image 73. Then, the information processing apparatus 200 sends the combination image data representing the combination image 73 and the identification information of the combination image data to the terminal apparatus 300.

When the person P1 visits a store or the like where the print apparatus 400 provided with a service by the information processing system 100 is installed, the person P1 operates the terminal apparatus 300 to send the identification information of the combination image data from the terminal apparatus 300 to the print apparatus 400.

Upon receiving this identification information, the print apparatus 400 sends the received identification information to the information processing apparatus 200, and receives combination image data corresponding to the identification information. Then, the print apparatus 400 prints the combination image 73 represented by the received combination image data on a T-shirt or the like selected by the person P1.

In the first embodiment, an inside of the element 71a in the content image 71 is set as a transparent region; however, the transparent region is not limited to this design. The information processing apparatus 200 may use an outside of the element 71a as the transparent region. In this case, the content image 71 and the image 72 may be superimposed such that a part of the image 72, which the user desires to make visible in the image 72, is overlapped may be superimposed with in the transparent region outside the element 71a.

Accordingly, in this embodiment, by superimposing an content image with an image acquired by the terminal apparatus 300, and by generating a combination image, in which one of an inner region and an outer region of a shape of an element extracted from content image data is a transparent region, it is possible to generate and output a new content image.

Moreover, only the content image 71 is superimposed on the image 72 in the example in FIG. 7; however, the first embodiment is not limited to this example. A plurality of content images may be superimposed on the image 72, and in each of the plurality of content images, an inside or an outside of an element shape may be a transparent region.

Figure 8A:
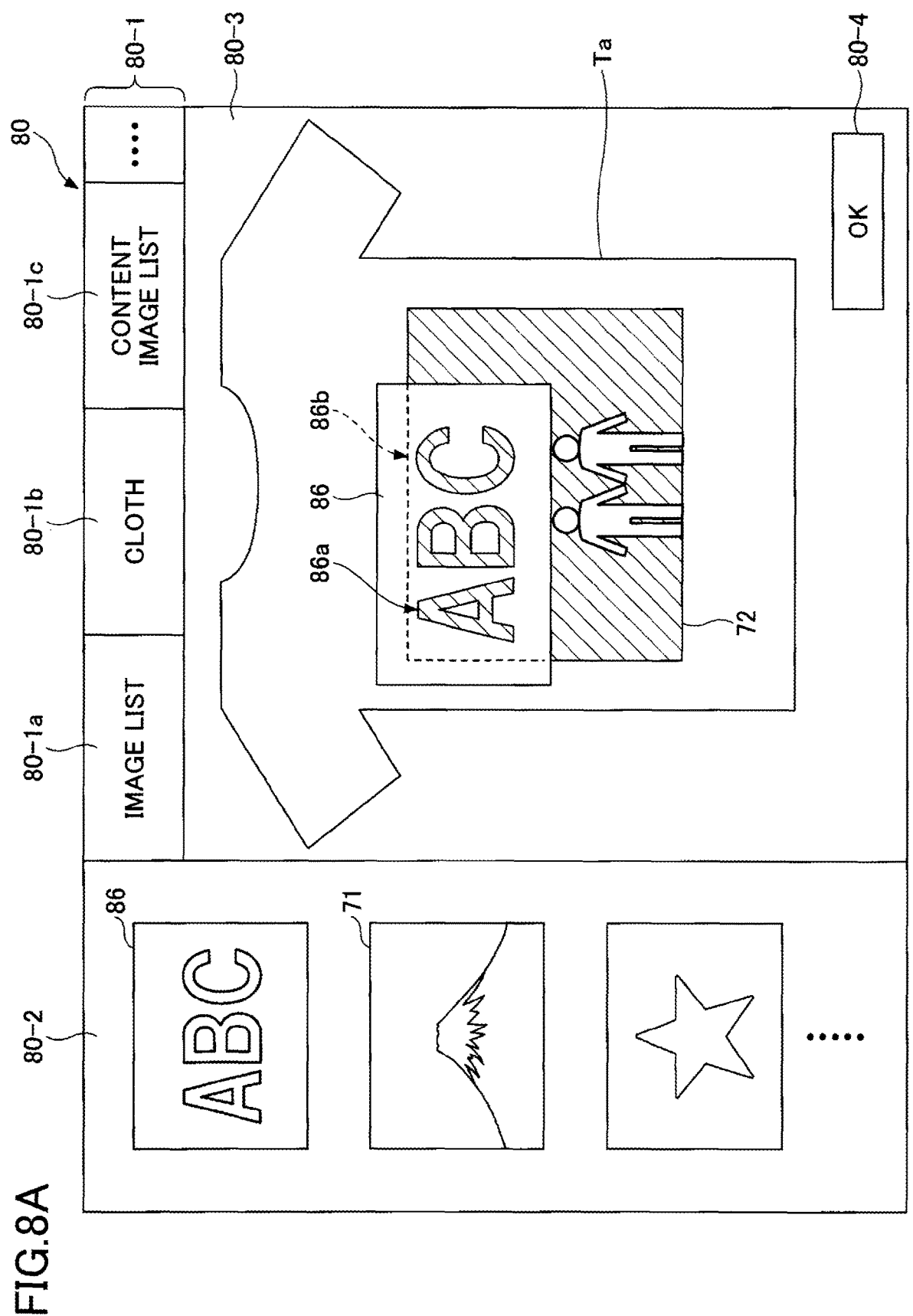
FIG. 8A is a first diagram illustrating a display example in the first embodiment.

Next, display examples of the terminal apparatus 300 will be described with reference to FIG. 8A and FIG. 8B. FIG. 8A is a first diagram illustrating a display example in the first embodiment. A screen 80 illustrated in FIG. 8A illustrates an example of a setting screen displayed on the terminal apparatus 300 in step S501 of FIG. 5.

The screen 80 includes display areas 80-1, 80-2, and 80-3. In the display area 80-1, operation buttons 80-1a, 80-1b, 80-1c, and the like are displayed.

The operation button 80-la may be a button for displaying a list of sets of image data stored in the terminal apparatus 300, for example. In the first embodiment, for example, when the operation button 80-la is operated, a list of sets of image data stored in the terminal apparatus 300 may be displayed in the display area 80-2. Image data selected from the image data list may be displayed in the display area 80-3.

The operation button 80-1b may be, for example, a button for setting a fabric for printing a combination image. In the first embodiment, for example, when the operation button 80-1b is operated, a list of a size or colors of a T-shirt, on which the combination image is printed, may be displayed in the display area 80-2 or the like.

The operation button 80-1c may be a button for displaying a list of sets of content image data, for example. In the first embodiment, for example, when the operation button 80-1c is operated, a list of sets of content image data stored in the content image DB 210 may be displayed in the display area 80-2 or the like. In FIG. 8A, the list of sets of content image data is displayed in the display area 80-2.

In the display area 80-3, an operation for determining a method of combining (superimposing) image data and content image data is performed. The display area 80-3 includes an operation button 80-4.

In the first embodiment, a silhouette indicating a shape for the fabric selected in step S502 is displayed in the display area 80-3. In the display area 80-3, the image data and the content image data are displayed on the silhouette indicating the shape of the fabric.

In the first embodiment, upon operating the operation button 80-4 after the operation of superimposing the image data and the content image data is performed in the display area 80-3, combination information may be generated in accordance with the image displayed in the display area 80-3.

In the example of FIG. 8A, it can be seen from the silhouette Ta that the fabric, on which the combination image is printed, is a T-shirt. The example of FIG. 8A represents a state, in which the image 72 (in FIG. 7) and a content image 86 including an element 86a "ABC" are selected, and a superimposing operation is being conducted in the display area 80-3.

In the first embodiment, for example, the positional relationship between the content image 86 and the image 72 may be determined by moving a position of the image 72 with respect to the content image 86.

Specifically, for example, the position of the content image 86 may be fixed in the display area 80-3, and only an operation of sliding the image 72 may be accepted.

In the display area 80-3, for example, the position where the content image 86 is displayed may be a position where at least a part of the content image is included in the silhouette Ta representing the fabric shape.

In the first embodiment, for example, while the position of the image 72 with respect to the content image 86 is being adjusted, when the image 72 superimposes with a region 86b other than the element 86a in the content image 86, the display control part 311 may cause the display device 328 to display the image 72 such that the image 72 is visible through the region 86b.

At this time, in the first embodiment, a transparency of the image 72 in the element 86a is set to be different from the transparency of the image 72 in the region 86b. Specifically, the transparency of the image 72 in the region 86b is made lower than the transparency of the image 72 in the element 86a. Accordingly, in the state of FIG. 8A, the image 72 superimposed with the element 86a is more clearly visible than the image 72 superimposed with the region 86b.

In the first embodiment, as described above, a display position of the content image is fixed while the image is moved, and the positional relationship between the content image and the image is adjusted; however, a method for adjusting the positional relationship is not limited to this example. The positional relationship between the content image and the image may be adjusted by fixing the display position of the image and moving the content image relative to the image, or may be adjusted by moving both the image and the content image.

Figure 8B:
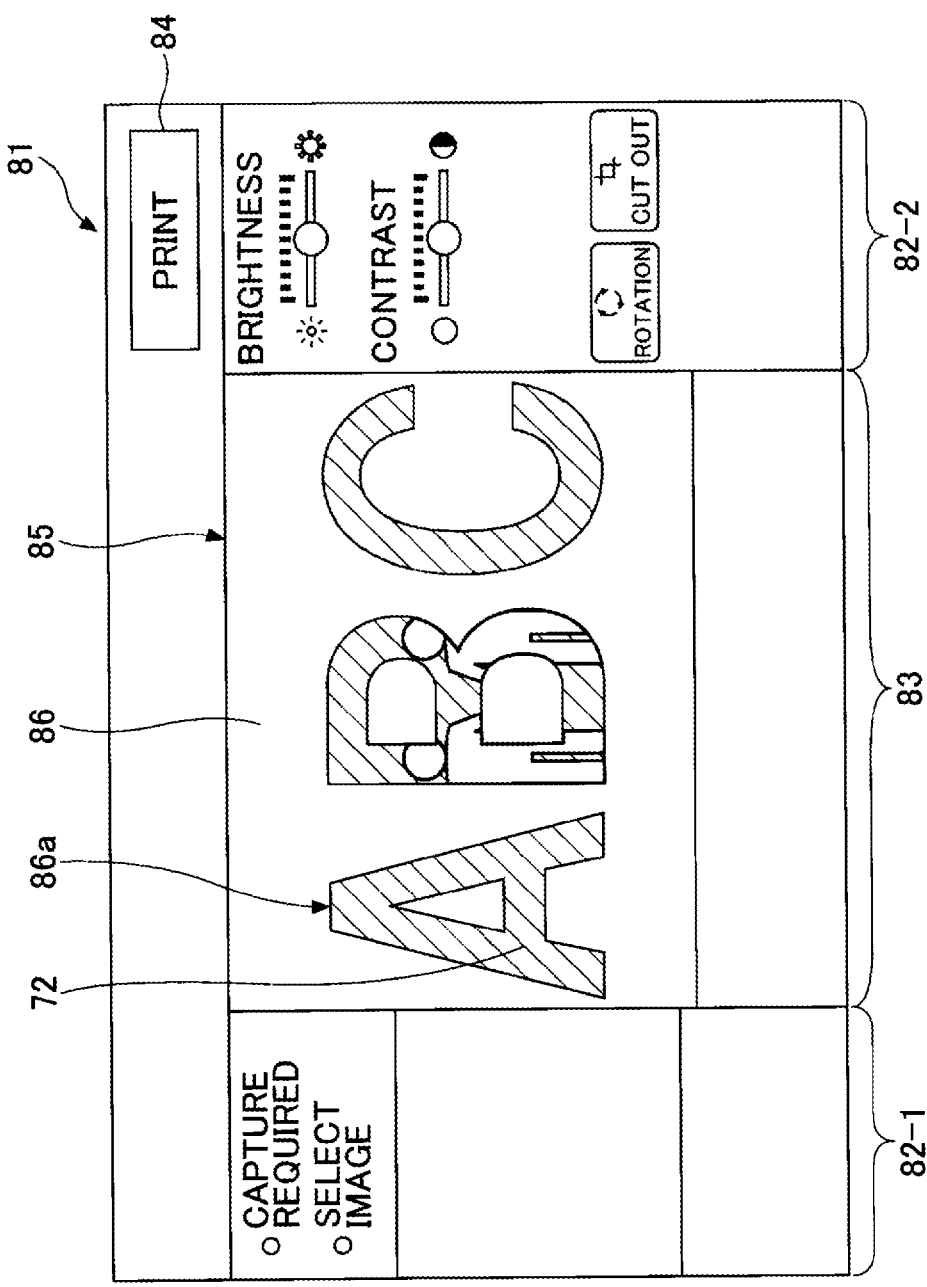
FIG. 8B is a second diagram illustrating a display example of the terminal apparatus in the first embodiment.

In the first embodiment, when the operation for superimposing the image 72 with the content image 86 is performed in the display area 80-3 and the operation button 80-4 is operated, the screen 80 is changed to a screen 81 depicted in FIG. 8B.

FIG. 8B is a second diagram illustrating a display example of the terminal apparatus in the first embodiment. For example, a screen 81 depicted in FIG. 8B corresponds to an example of a screen displayed on the terminal apparatus 300 in step S507 of FIG. 5.

The screen 81 includes display areas 82-1 and 82-2, a display area 83, and an operation button 84.

The display area 82-1 displays operation parts for selecting image data and the like. For example, the display area 82-2 displays operation components for setting a brightness and a contrast of an image.

In the display area 83, a combination image 85 is displayed. The combination image 85 is an image, in which the content image 86 is superimposed on the image 72. In this combination image 85, each shape of letters "ABC", which is the element 86a extracted from the content image 86, is set to be a transparent region, and the image 72 is visible in this transparent area. In other words, the combination image 85 is an image obtained by cutting out the image 72 in accordance with the shape indicated by the element 86a. In the example of FIG. 8B, this combination image 85 is printed on, for example, a T-shirt, a bag, or the like.

That is, in the first embodiment, in a case in which the first image data is the content image data and the second image data is the image data, a part of the second image is displayed in accordance with each shape of elements included in the first image represented by the first image data.

As described above, in the first embodiment, it is possible to create a content image having a new meaning by generating a combination image by combining a content image having a certain meaning and an image acquired by the terminal apparatus 300.

For example, in the combination image 73 depicted in FIG. 7, by combining the element 71a representing "mountain" and the image 72, it is possible to apply a meaning of "an image associated with the mountain" with respect to the image 72. Moreover, for example, in the combination image 85 depicted in FIG. 8B, it is possible to apply a meaning of "an image associated with ABC" to the image 86 by combining the element 86a meaning "ABC" and the image 72.

In a case in which elements are letters indicating a place name, a combination image, in which a part of an image is associated with the letters indicating the place name, is generated. In a case in which elements are numerals indicating a date, a combination image, in which a part of an image is associated with the date is generated.

As described above, in the first embodiment, it is possible to generate a new content image (combination image), in which a meaning of elements extracted from content image data is associated with an image represented by image data acquired by the terminal apparatus 300.

In the first embodiment described above, a setting screen or the like for generating a combination image is displayed on the terminal apparatus 300 by the combination instruction part 310 of the terminal apparatus 300; however, the first embodiment is not limited to this functional configuration. The combination instruction part 310 may be provided on the information processing apparatus 200. In this case, the terminal apparatus 300 simply displays the setting screen described above on the terminal apparatus 300 only by accessing the information processing apparatus 200.

In the first embodiment, the terminal apparatus 300 and the information processing apparatus 200 are described as separate apparatuses; however, the first embodiment is not limited to this configuration. The information processing apparatus 200 may include functions of the terminal apparatus 300.

Second Embodiment

The second embodiment will be described below with reference to the drawings. The second embodiment is different from the first embodiment in that paid content image data or paid image data exists and in that content image data are automatically selected from metadata of image data. In the following description of the second embodiment, differences from the first embodiment will be described. Components having the same functional configurations as those in the first embodiment are denoted with the same reference numerals as those used in the description of the first embodiment, and thus, explanations thereof will be omitted.

Figure 9:
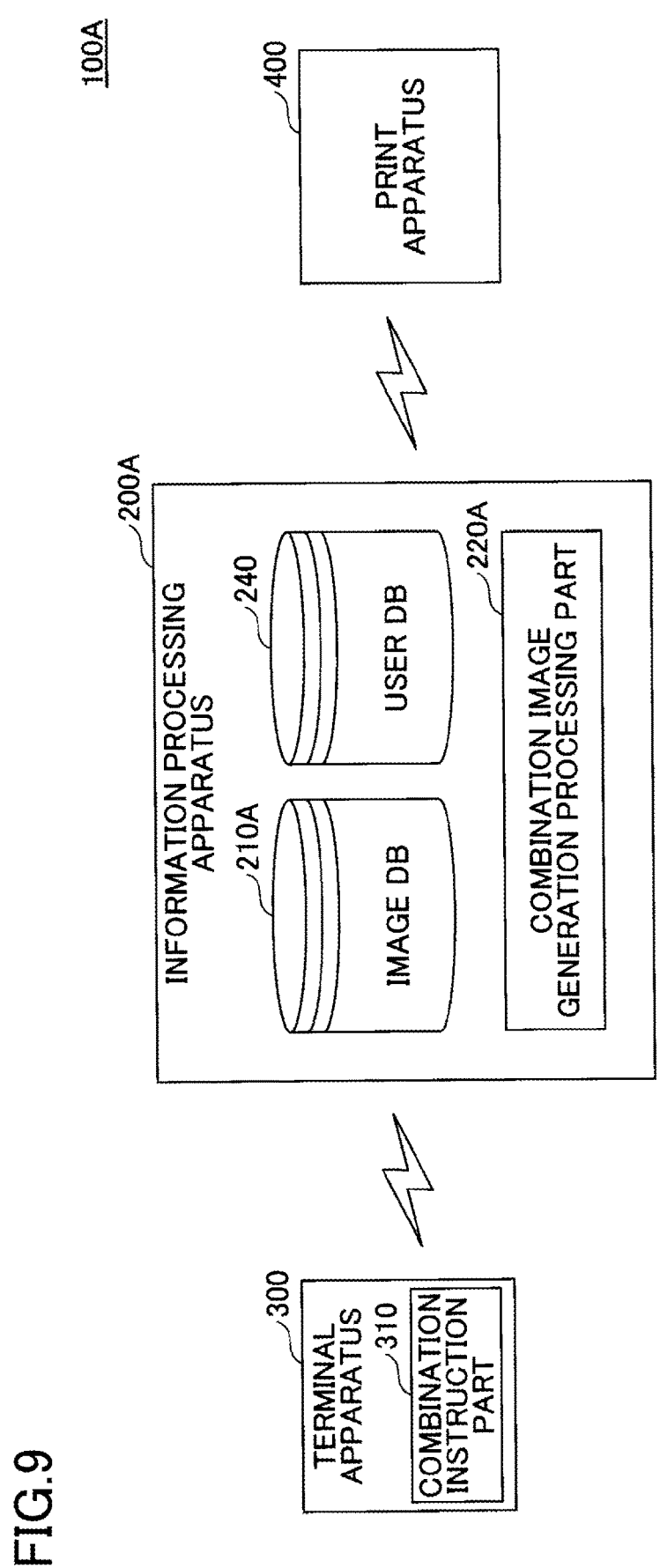
FIG. 9 is a diagram illustrating an information processing system in a second embodiment.

FIG. 9 is a diagram illustrating an information processing system in the second embodiment. The information processing system 100A in the second embodiment includes an information processing apparatus 200A, a terminal apparatus 300, and a print apparatus 400.

The information processing apparatus 200A in the second embodiment includes an image DB 210A, a user DB 240, and a combination image generation processing part 220A.

The image DB 210A of the information processing apparatus 200A in the second embodiment stores content image data and image data to be combined with the content image data. Moreover, the image DB 210A stores information indicating whether the content image data and the image data are paid data, or the like.

In addition, the user DB 240 in the second embodiment stores information pertinent to a user who uploaded the content image data and the image data to the image DB 210A.

FIG. 10A is a first diagram illustrating an example of an image DB in the second embodiment. The image DB 210A in the second embodiment includes, as information items, "IMAGE ID", "TYPE", "IMAGE DATA", "REGISTERED USER ID", "PAID OR FREE", and "METADATA", and the item "IMAGE ID" is associated with other items.

A value of the item "IMAGE ID" indicates identification information for specifying the content image data and the image data stored in the image DB 210A.

A value of the item "TYPE" indicates whether image data is content image data, or image data captured by the terminal apparatus 300, an imaging device, or the like.

A value of the item "IMAGE DATA" is an entity of the content image data or the image data. A value of the item "REGISTERED USER ID" indicates a user ID for specifying a user who has updated the content image data and the image data to the information processing apparatus 200A. A value of the item "PAID OR FREE" indicates whether content image data or image data is provided to be paid or for free.

A value of the item "METADATA" indicates metadata attached to the image data. The metadata includes, for example, information indicating a location where the image data is acquired, date information indicating a date and time when the image data was acquired, information corresponding to a tag attached to the image data, and the like.

In the example of FIG. 10A, for example, the image data of the image ID "101" is content image data uploaded by a user specified by a user ID "xx", and is provided for a fee.

Note that the items of information included in the image DB 210A are examples, and the image DB 210A may include items other than the items depicted in FIG. 10A.

FIG. 10B is a second diagram illustrating an example of the image DB in the second embodiment. An image DB 210A-1 in the second embodiment includes an item "TRANSPARENCY" in addition to the items of the image DB 210A as information items, and is associated with the item "IMAGE ID".

A value of the item "TRANSPARENCY" indicates whether or not a lower layer image is allowed to be visible through content image data or a shape of an element included in image data. Specifically, in a case in which the value of the item "TRANSPARENCY" is "YES", the lower layer image is allowed to be visible in accordance with a shape of the element included in the content image data or the image specified by the image ID.

In addition, when a value of the item "TRANSPARENCY" is "NO", the lower layer image is not allowed to be visible and shown with respect to the content image data or the image data specified by the image ID.

A value of the item "TRANSPARENCY" may be set by, for example, a user who performs an upload or the like at a time content image data or image data is uploaded to the image DB 210A-1.

FIG. 11 is a diagram illustrating an example of a user DB in the second embodiment. The user DB 240 in the second embodiment includes, as information items, "REGISTERED USER ID", "IMAGE ID", "FINANCIAL INFORMATION", "BILLING COUNT", and the like, and the item "REGISTERED USER ID" is associated with other items. In the following description, information including a value of the item "REGISTERED USER ID" and values of other items in the user DB 240 is referred to as user information.

A value of the item "FINANCIAL INFORMATION" is information on a financial institution or the like, which is a payment destination of a price for use of image data associated with a user specified by the registered user ID. Specifically, for example, the value of the item "FINANCIAL INFORMATION" may be bank account information or the like.

A value of the item "BILLING COUNT" indicates the number of times that paid image data uploaded by the user are used.

Next, each function of the information processing system 100A in the second embodiment will be described with reference to FIG. 12. FIG. 12 is a diagram illustrating functions of the information processing apparatus and the terminal apparatus in the second embodiment.

The information processing apparatus 200A in the second embodiment includes a combination image generation processing part 220A. The combination image generation processing part 220A in the second embodiment includes a communication part 221, an image acquisition part 222, a content selection part 223A, a combination processing part 225, a combination image data output part 226, a metadata extraction part 227, a charge determination part 228, a charge history storage part 229, and an image accumulation part 230.

The metadata extraction part 227 extracts metadata attached to the image data acquired by the image acquisition part 222 from the terminal apparatus 300.

The charge determination part 228 determines whether or not the selected content image data are charged. The charge history storage part 229 increases the billing count in the user DB 240 as the charge history upon determining that the content image data are to be charged.

The image accumulation part 230 stores the image data uploaded from the terminal apparatus 300 in the image DB 210A.

Figure 13:
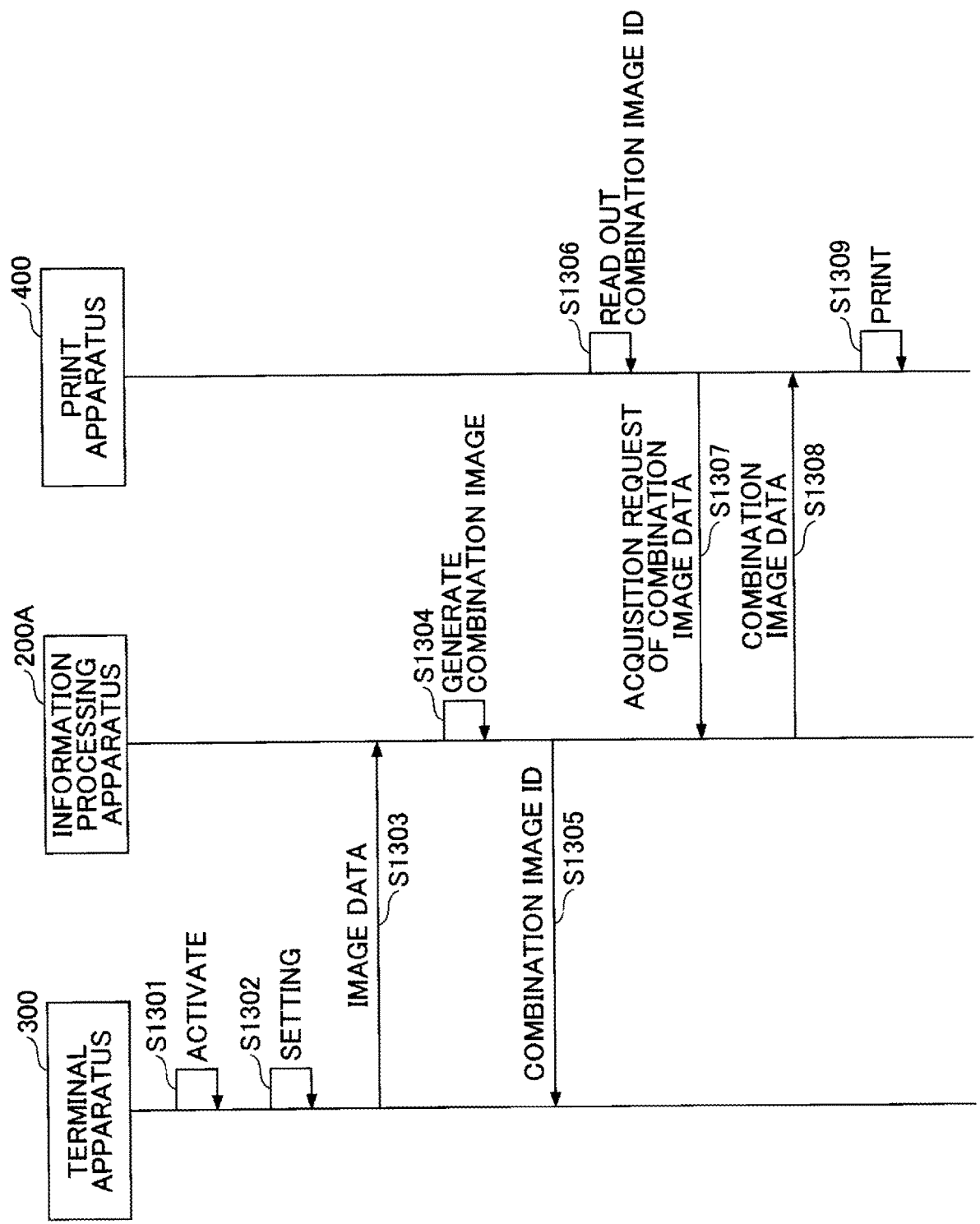
FIG. 13 is a sequence diagram for explaining an operation of the information processing system in the second embodiment.

Next, an operation of the information processing system 100A in the second embodiment will be described with reference to FIG. 13. FIG. 13 is a sequence diagram for explaining an operation of the information processing system in the second embodiment.

Processes in steps S1301 and S1302 in FIG. 13 are the same as the processes in steps S501 and S502 in FIG. 5, and thus, explanations thereof will be omitted.

Subsequently, the terminal apparatus 300 captures image data by an operation of a user, and sends the captured image data to the information processing apparatus 200A (step S1303).

In the example of FIG. 13, the terminal apparatus 300 sends the image data captured on a spot to the information processing apparatus 200A; however, the second invention is not limited to this procedure. In a process of sending the image data from the terminal apparatus 300 to the information processing apparatus 200A may be selected from sets of image data stored in the terminal apparatus 300 and may be sent to the information processing apparatus 200A, similar to a procedure described with reference to FIG. 5.

Upon receiving the image data from the terminal apparatus 300, the information processing apparatus 200A in the second embodiment generates combination image data (step S1304). Details of the process in step S1304 will be described later.

Processes from step S1305 to step S1309 in FIG. 13 is the same as processes from step S510 to step S514 in FIG. 5, and thus, the explanations thereof will be omitted.

Figure 14:
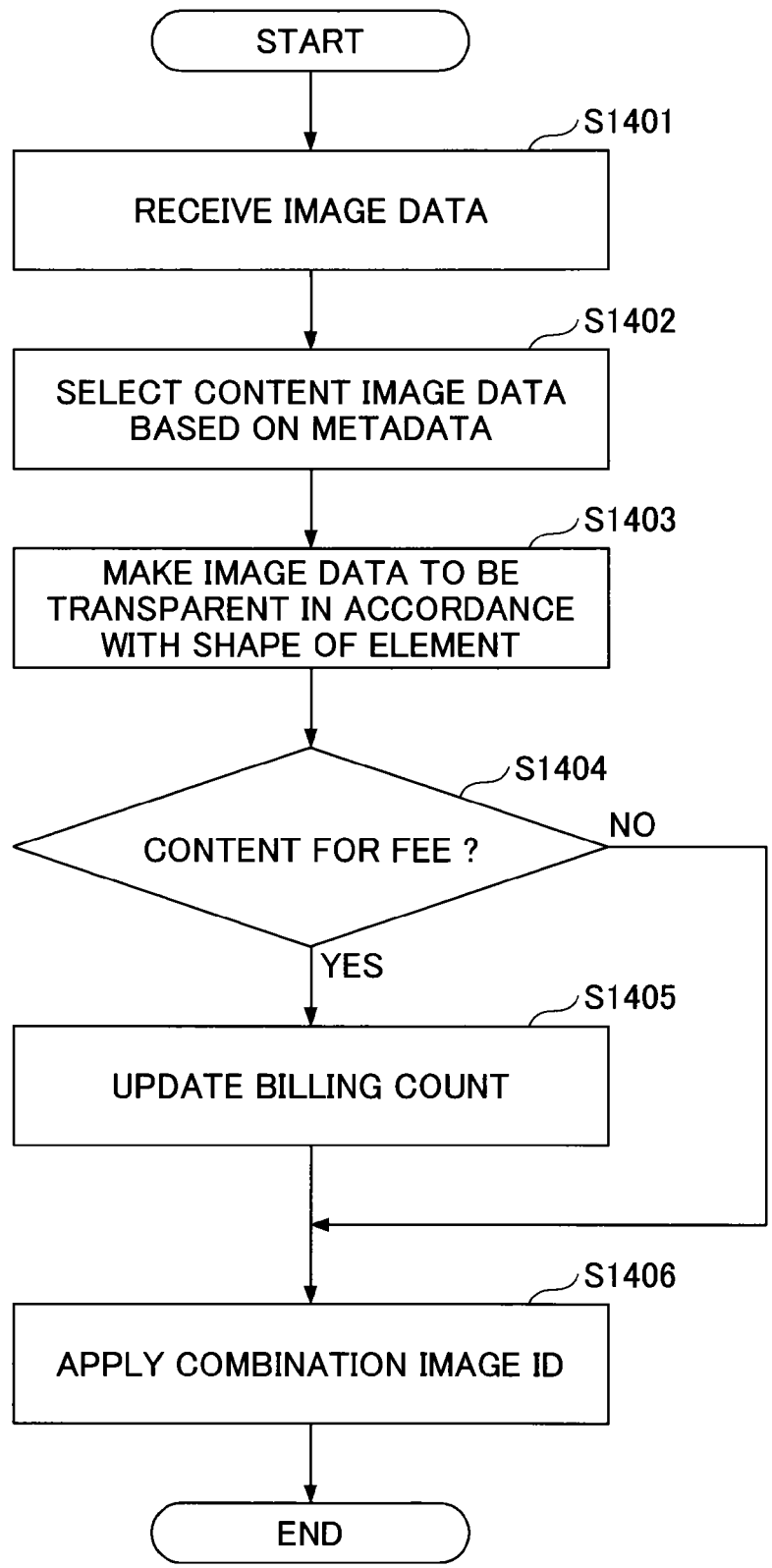
FIG. 14 is a flowchart for explaining a combination image data generation process in the second embodiment.

Next, generation of combination image data in the second embodiment will be described with reference to FIG. 14. FIG. 14 is a flowchart for explaining a combination image data generation process in the second embodiment.

In the combination image generation processing part 220A of the information processing apparatus 200A in the second embodiment, the image acquisition part 222 acquires the image data received by the communication part 221 (step S1401).

Subsequently, the combination image generation processing part 220A extracts metadata attached to the image data by the metadata extraction part 227, and selects content image data based on the extracted metadata with reference to the image DB 210A by the content selection part 223A (step S1402).

Specifically, for example, in a case in which the metadata of the image data is location information, the content selection part 223A may select content image data including, as an element, a place name indicated by the location information. In addition, in a case in which the metadata of the image data is date and time information, the content selection part 223A may select content image data including, as element, an era corresponding to the date and time information, a year, or the like.

In the second embodiment, the content selection part 223A selects a set of content image data based on metadata from a plurality of sets of content image data stored in the image DB 210A; however, the selection of a set of content image data is not limited to this selection manner. The content selection part 223A may select content image data other than the content image data stored in the image DB 210A. For example, the content selection part 223A may acquire content image data including an element corresponding to metadata from the Internet.

Subsequently, the combination image generation processing part 220A causes the combination processing part 225 to superimpose an image represented by the selected content image data on an image represented by the image data, and make the image represented by the image data visible within an element region (step S1403).

For example, in a case in which the image data acquired from the terminal apparatus 300 includes an image of a person's face (face image), the combination processing part 225 in the second embodiment may superimpose a content image and an image so as to position the face image within an element region. In this case, in particular, eye portions of the person may be positioned within the element region. In the second embodiment, the combination processing part 225 may be able to set an image in advance to be arranged in the element region in an image represented by image data.

Subsequently, the combination image generation processing part 220A determines whether or not the selected content image data is provided for a fee by the charge determination part 228 (step S1404). When it is determined that the content image data are not to be paid by a fee in step S1404, that is, when the content image data are provided by free of charge, the combination image generation processing part 220A proceeds to step S1406 described later.

When it is determined that the content image data are to be paid by a fee in step S1404, the combination image generation processing part 220A updates the charge history storage part 229 by adding "1" to the billing count of the registered user ID associated with the selected content image data (step S1405).

Subsequently, the combination image generation processing part 220A assigns a combination image ID to the combination image data (step S1406), and terminates this process.

As described above, in the second embodiment, it is possible to generate combination image data with content image data suitable for image data simply by sending the image data from the terminal apparatus 300. In the second embodiment, it is possible to provide an uploaded content image data for a fee.

Next, an upload of image data in the present embodiment will be described. In the second embodiment, for example, it is possible to send image data captured by a user with his or her terminal apparatus 300 or content image data created by himself or herself, to the information processing apparatus 200A.

Specifically, for example, the user may upload image data, to which a tag (an event name, a concert name, or the like) is assigned using an application such as SNS (Social Networking Service) from the terminal apparatus 300 to the information processing apparatus 200A.

In the second embodiment, at a time image data are uploaded from the terminal apparatus 300, a type of the image data and information of paid or free may be set by the user. The information indicating contents of these settings and the registered user ID of the user of the terminal apparatus 300 may be sent together with the image data from the terminal apparatus 300 to the information processing apparatus 200A.

In the second embodiment, for a user who has uploaded image data and content image data for free of charge, a selling price of a recording medium (such as a T-shirt), on which a combination image is printed by the print apparatus 400 may be discounted.

When the combination image generation processing part 220 of the information processing apparatus 200A in the second embodiment receives an upload of image data from the terminal apparatus 300, the image accumulation part 230 acquires settings for a type of the image data, metadata applied to the image data, a registered user ID, paid or free, and the like, and stores together with the image data in the image DB 210A.

Therefore, in the second embodiment, it is possible to generate a new content image (combination image) using one or more sets of image data accumulated by a large number of users.

Third Embodiment

A third embodiment will be described below with reference to the drawings. The third embodiment is different from the second embodiment in that an information processing apparatus selects both image data and content image data. In the following description, differences from the second embodiment will be described, and those having the same functional configuration as those of the second embodiment will be denoted by the same reference numerals as those used in the description of the second embodiment. The description is omitted.

Figure 15:
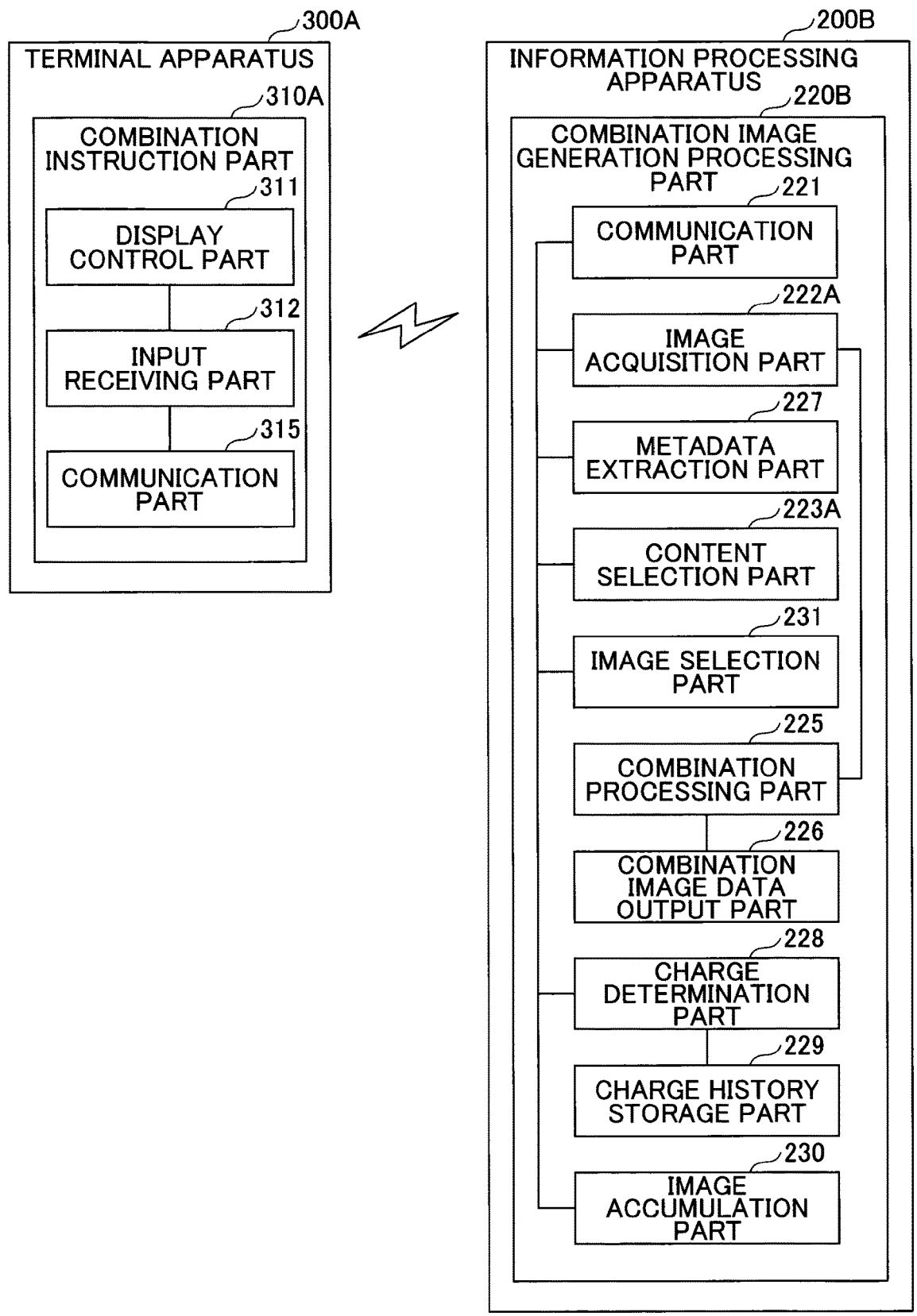
FIG. 15 is a diagram illustrating functions of an information processing apparatus and a terminal apparatus in a third embodiment.

FIG. 15 is a diagram illustrating functions of an information processing apparatus and a terminal apparatus in the third embodiment. The information processing apparatus 200B in the third embodiment includes a combination image generation processing part 220B. The combination image generation processing part 220B includes a communication part 221, an image acquisition part 222A, a content selection part 223A, a combination processing part 225, a combination image data output part, a metadata extraction part 227, a charge determination part 228, a charge history storage part 229, an image accumulation part 230, and an image selection part 231.

The location information acquisition part 222A acquires location information received from the terminal apparatus 300A. The image selection part 231 selects image data whose type indicates "IMAGE" from the image DB 210A based on the location information. The image selection part 231 may select image data in the network in a case in which there is no corresponding image data in the image DB 210A.

The terminal apparatus 300A in the third embodiment includes a combination instruction part 310A. The combination instruction part 310A in the third embodiment only needs to include a display control part 311, an input receiving part 312, and a communication part 315.

Figure 16:
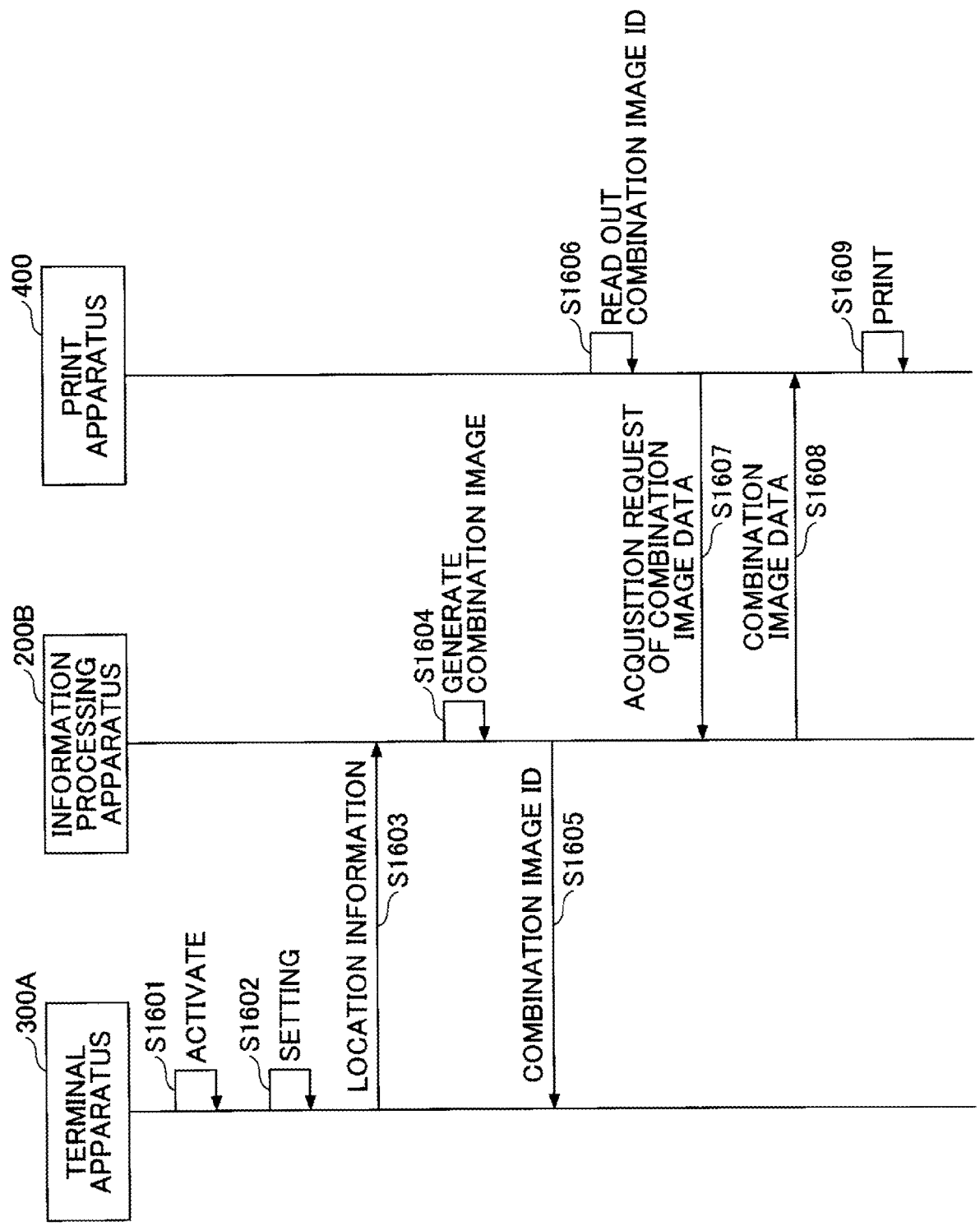
FIG. 16 is a sequence diagram for explaining an operation of an information processing system in the third embodiment.

FIG. 16 is a sequence diagram for explaining an operation of the information processing system in the third embodiment. Processes in step S1601 and step S1602 in FIG. 16 is the same as processes in step S501 and step S502 in FIG. 5 and thus, explanations thereof will be omitted.

Subsequently, the terminal apparatus 300A sends location information acquired by a GPS (Global Positioning System) function or the like to the information processing apparatus 200B (step S1603).

In the information processing apparatus 200B, when the location information acquisition part 222A acquires the location information received by the communication part 221, the combination processing part 225 generates combination image data (step S1604). Details of the process in step S1604 will be described later.

Processes from step S1605 to step S1609 in FIG. 16 are the same as the processes from step S510 to step S514 in FIG. 5, and thus, explanations thereof will be omitted.

Figure 17:
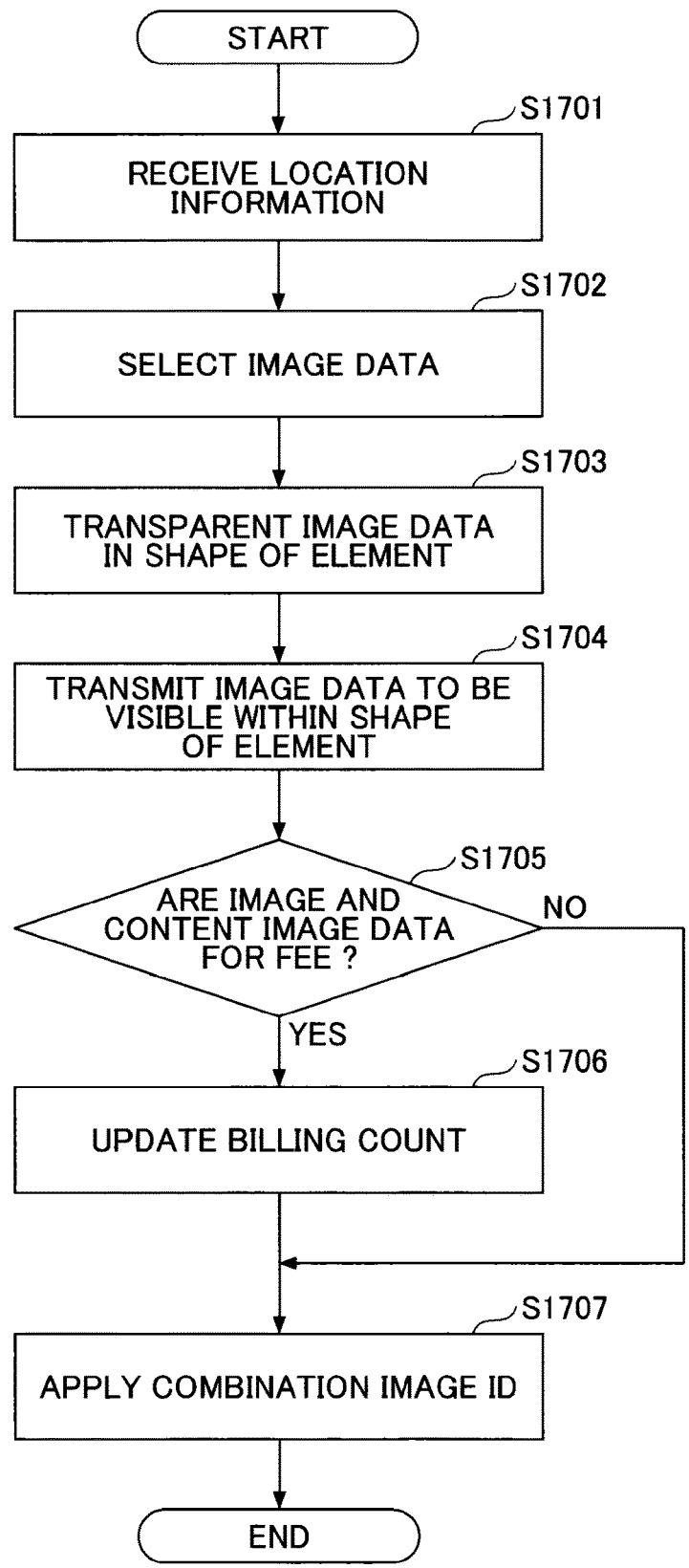
FIG. 17 is a diagram illustrating a combination image data generation process in the third embodiment.

Next, a combination image data generation process in the third embodiment will be described with reference to FIG. 17. FIG. 17 is a diagram illustrating the combination image data generation process in the third embodiment.

In the combination image generation processing part 220B in the third embodiment, when the location information acquisition part 222A acquires location information (step S1701), the image selection part 231 selects image data based on the location information (step S1702).

Specifically, the image selection part 231 may refer to the image DB 210A, and may select image data, in which the received location information is included within a predetermined range from the location information included in the metadata, and the type indicates "IMAGE".

Subsequently, the combination image generation processing part 220B selects content image data based on the metadata of the image data selected by the image selection part 231 by the content selection part 223A (step S1703).

Subsequently, the combination image generation processing part 220A causes the combination processing part 225 to superimpose an image represented by the selected content image data on an image represented by the image data, and to make the image represented by the image data visible within the element region (step S1704).

Subsequently, the combination image generation processing part 220B determines whether each of the image data selected by the image selection part 231 and the content image data selected by the content selection part 223A is provided for a fee.

When it is determined that neither is charged in step S1705, that is, when it is determined that the image data and the content image data are provided free of charge, the combination image generation processing part 220A proceeds to step S1707 described later.

When it is determined that the image data and it is determined that the content image data are provided for a fee in step S1705, the combination image generation processing part 220B updates the charge history storage part 229 by adding "1" to the billing count of the registered user ID associated with the selected image data or content image data (step S1706).

Subsequently, the combination image generation processing part 220B assigns a combination image ID to the combination image data (step S1707), and terminates this process.

In the third embodiment, the location information is transmitted from the terminal apparatus 300A to the information processing apparatus 200B; however, the third embodiment is not limited to this transmission manner. In the third embodiment, for example, information included in the metadata of the image data may be transmitted from the terminal apparatus 300A to the information processing apparatus 200B, instead of the location information. In this case, the information processing apparatus 200B may select image data based on information included in the metadata.

As described above, according to the third embodiment, it is possible to generate a new content image (combination image).

Fourth Embodiment

A fourth embodiment will be described below with reference to the drawings. The fourth embodiment is different from the first embodiment in that it is determined whether or not a region representing a shape of an element is defined as a transparent region when generating a combination image. Accordingly, in the following description in the fourth embodiment, differences from the first embodiment will be described. Components having the same functional configurations as those in the first embodiment are denoted with the same reference numerals as those used in the description of the first embodiment, and thus, explanations thereof will be omitted.

Figure 18:
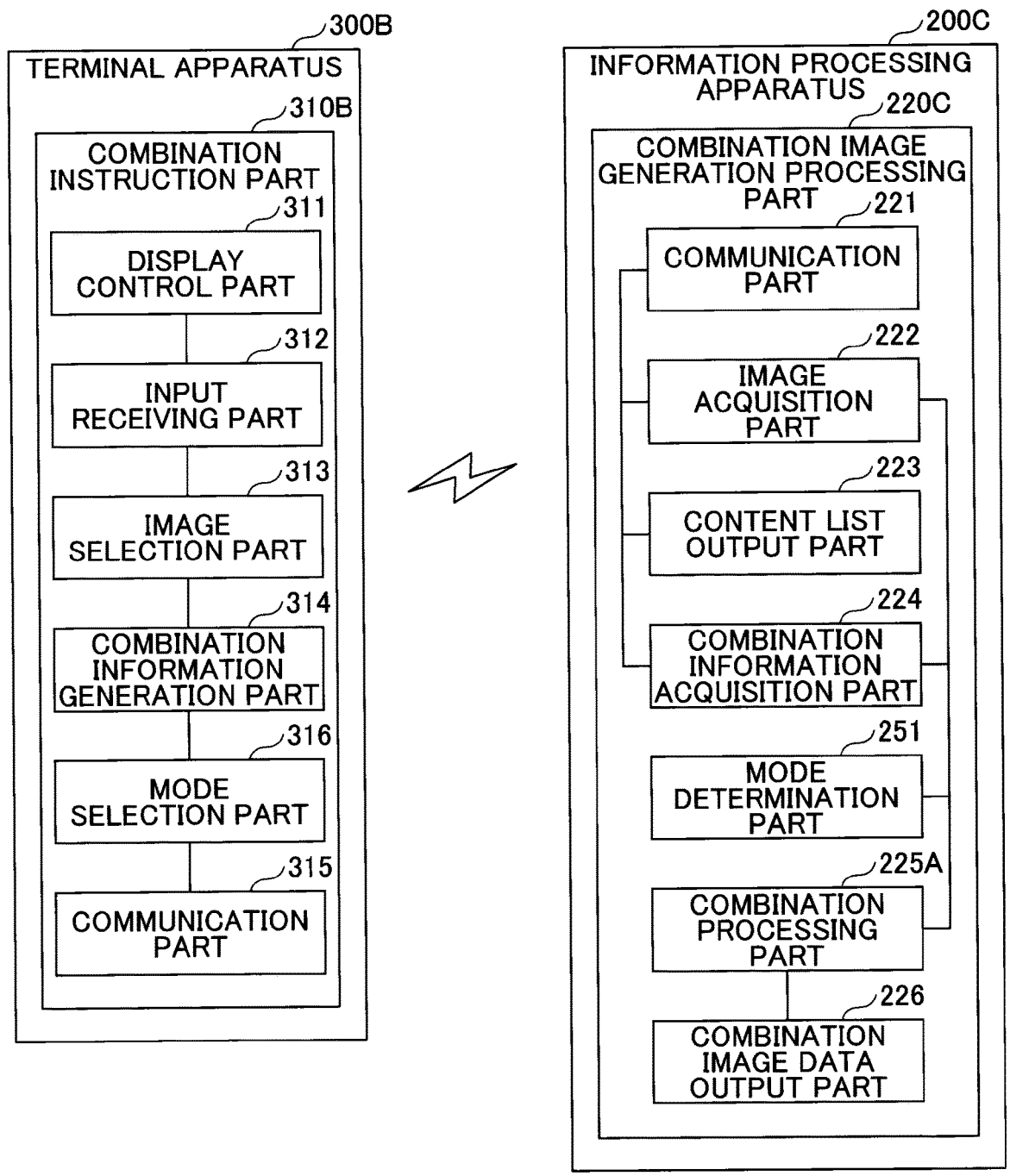
FIG. 18 is a diagram illustrating functions of an information processing apparatus and a terminal apparatus in a fourth embodiment.

FIG. 18 is a diagram illustrating functions of an information processing apparatus and a terminal apparatus in the fourth embodiment.

In the information processing apparatus 200C, a combination image generation processing part 220C includes a communication part 221, an image acquisition part 222, a content list output part 223, a combination information acquisition part 224, a combination processing part 225A, a combination image data output part 226, and a mode determination part 251.

The mode determination part 251 in the fourth embodiment determines the mode selected in the terminal apparatus 300B based on the mode information transmitted from the terminal apparatus 300B, and instructs the combination processing part 225A to generate combination image data according to the determination result. Details of the mode information are described later.

The combination processing part 225A in the fourth embodiment generates combination image data in a mode according to the result of the determination by the mode determination part 251.

A combination instruction part 310B of the terminal apparatus 300B in the fourth embodiment includes a display control part 311, an input receiving part 312, an image selection part 313, a combination information generation part 314, a communication part 315, and a mode selection part 316

In the fourth embodiment, when the input receiving part 312 receives a selection of a mode representing a method for combining an image and a content image in a setting screen displayed on the terminal apparatus 300B, the mode selection part 316 generates mode information according to this selection.

In the following, the mode in the fourth embodiment will be described.

The mode in the fourth embodiment indicates a method (a superimposing method) for combining an image and a content image. In the fourth embodiment, there are two modes: a transparency mode and a superposition mode, and the mode is switched by an operation of a user at the terminal apparatus 300B.

The transparency mode corresponds to a method for generating a combination image by using an area (an area inside or outside an element) indicated by a shape of the element extracted from the content image data as a transparent region in a case of superimposing the image with the content image. In other words, the transparency mode is a mode for allowing to generate third image data representing a third image, in which at least a part of second image data represented by a second image is displayed in either the inner region or the outer region of the shape of the element included in a first image represented by first image data is generated.

In the superposition mode, elements extracted from the content image data are superimposed on the image to produce a combination image. In other words, the superposition mode is a mode for allowing to generate the third image data representing the third image, in which at least a part of the second image is not displayed in an inner region or an outer region where at least the part of the second image is displayed in the transparency mode, and in which at least an image portion other than the part of the second image is displayed in a region other than the inner region or the outer region where at least the part of the second image is displayed in the transparency mode. That is, in the superposition mode, the second image is not displayed in a region where at least a part of the second image is displayed in the transparency mode.

In the terminal apparatus 300B in the fourth embodiment, when the input receiving part 312 receives an operation for selecting a mode, the mode selection part 316 generates mode information representing the selected mode and sends the mode information to the information processing apparatus 200C.

Figure 19:
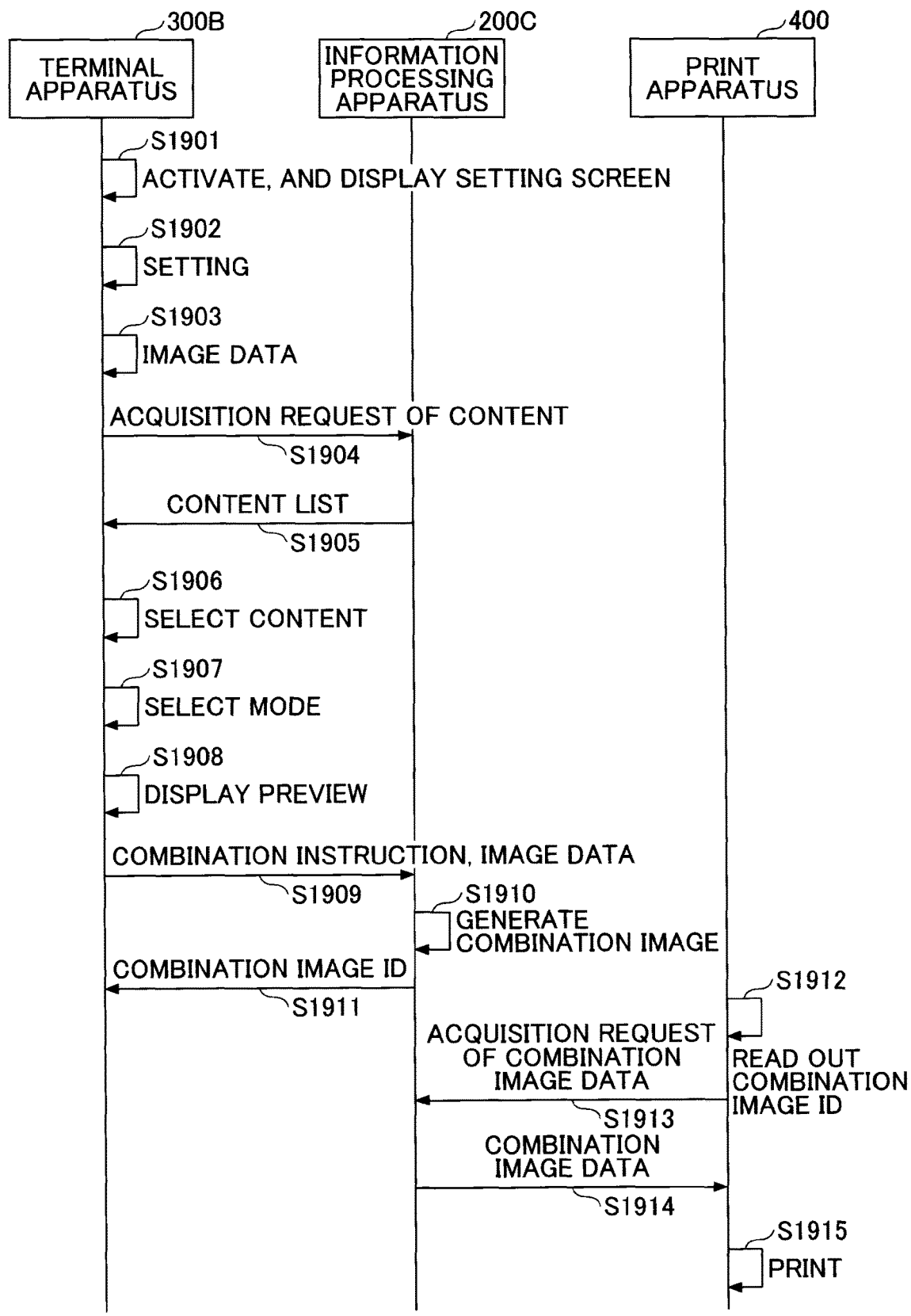
FIG. 19 is a sequence diagram illustrating an operation of an information processing system in the fourth embodiment.

Hereinafter, an operation of the information processing system in the fourth embodiment will be described with reference to FIG. 19. FIG. 19 is a sequence diagram illustrating the operation of an information processing system in the fourth embodiment.

Because processes from step S1901 to step S1906 of FIG. 19 are the same as processes from step S501 to step S506 of FIG. 5, explanations thereof will be omitted.

In step S1906, when receiving a selection of the content image data, the terminal apparatus 300B subsequently receives a selection of the mode by the input receiving part 312, and generates mode information representing the selected mode by the mode selection part 316 (Step S1907).

Subsequently, in step 1908, the terminal apparatus 300B displays a preview image, in which in the selected mode in accordance with an operation of a user, a content image represented by the selected content image data and an image represented by the selected image data are combined (step S1903).

When a positional relationship between the content image and the image is determined by the user, the terminal apparatus 300B generates combination information including information indicating the positional relationship between the content image and the image by the combination information generation part 314, and sends the selected image data and the mode information as a combination instruction to the information processing apparatus 200C (step S1909).

When the information processing apparatus 200C receives the combination instruction and the image data from the terminal apparatus 300B, the combination processing part 225A generates a combination image data by superimposing the selected content image and the image data based on the mode information and the combination information (step S1910). Details of step S1910 are described below.

Because processes from step S1911 to step S1915 of FIG. 19 are the same as processes from step S510 to step S514 of FIG. 5, explanations thereof will be omitted.

Figure 20:
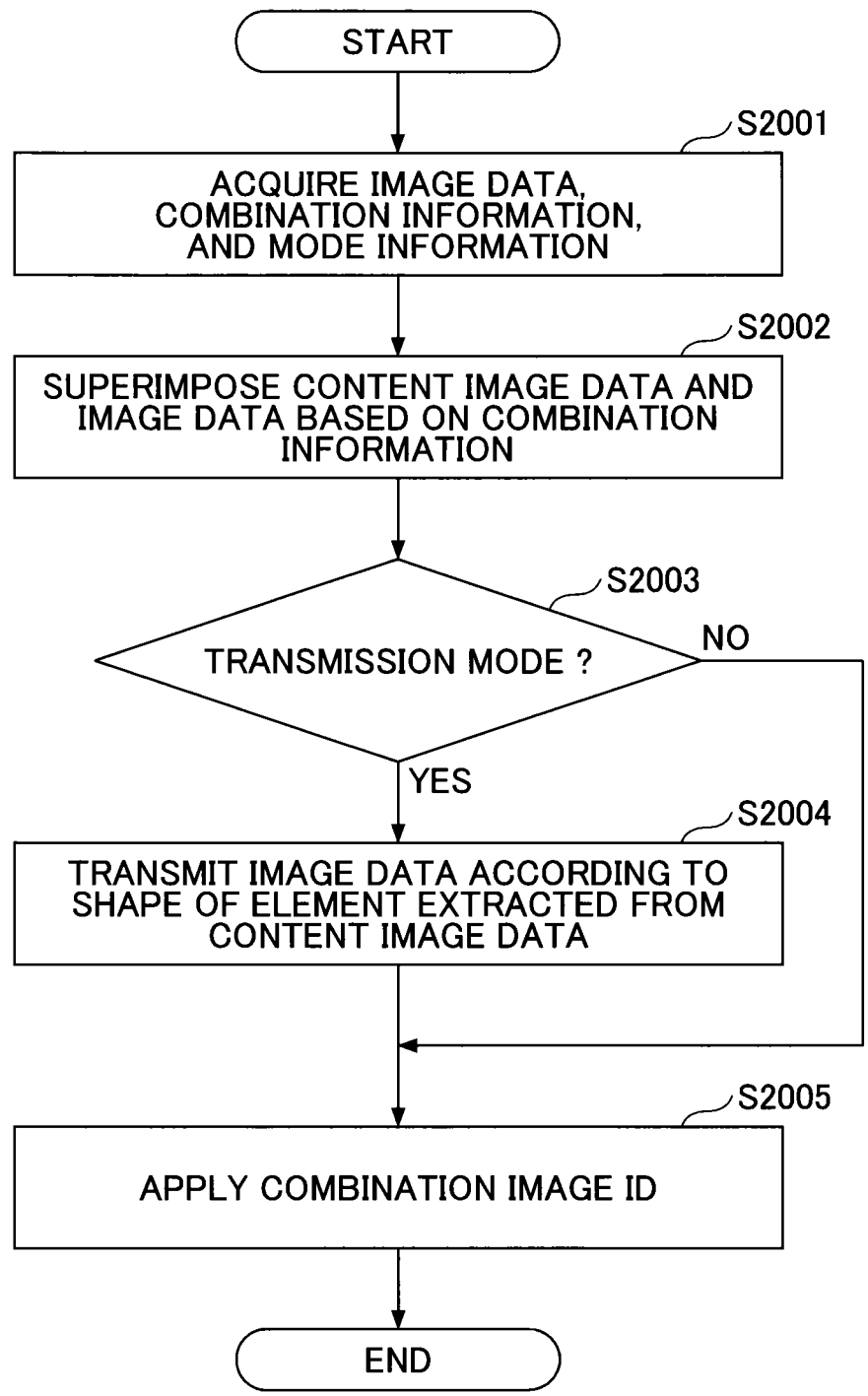
FIG. 20 is a diagram for explaining a process for generating combination image data in the fourth embodiment.

Next, a process of the combination processing part 225A of the information processing apparatus 200C in the fourth embodiment will be described with reference to FIG. 20. FIG. 20 is a diagram for explaining a process for generating the combination image data in the fourth embodiment. FIG. 20 depicts details of the processes in step S1910 of FIG. 19.

The combination image generation processing part 220C in the fourth embodiment acquires image data by the image acquisition part 222 upon receiving the image data from the terminal apparatus 300B, acquires combination information by the combination information acquisition part 224 upon receiving the combination information from the terminal apparatus 300B, and acquires mode information by the mode determination part 251 (step S2001).

Subsequently, the combination image generation processing part 220C superimposes one image represented by the selected content image data and another image represented by the image data by the combination processing part 225A to correspond to the position relationship represented by the combination information (step S2002). More specifically, the combination processing part 225A superimposes the image represented by the content image data on the image represented by the image data.

Subsequently, the combination processing part 225A determines whether or not a mode indicated by the mode information is a transparency mode, by the mode determination part 251 (step S2003).

In step S2003, when the mode indicated by the mode information is the transparency mode, the combination processing part 225A advances to step S2004.

In step S2003, when the mode indicated by the mode information is not the transparency mode, that is, the mode indicated by the mode information is the superposition mode, the combination processing part 225A advances to step S2005.

Because processes of step S2004 and step S2005 in FIG. 20 are the same as processes of step S603 and step S604 in FIG. 6, and thus, explanations thereof will be omitted.

As described above, in the fourth embodiment, it is possible for a user to select a method for combining the image data and the content image data.

Figure 21:
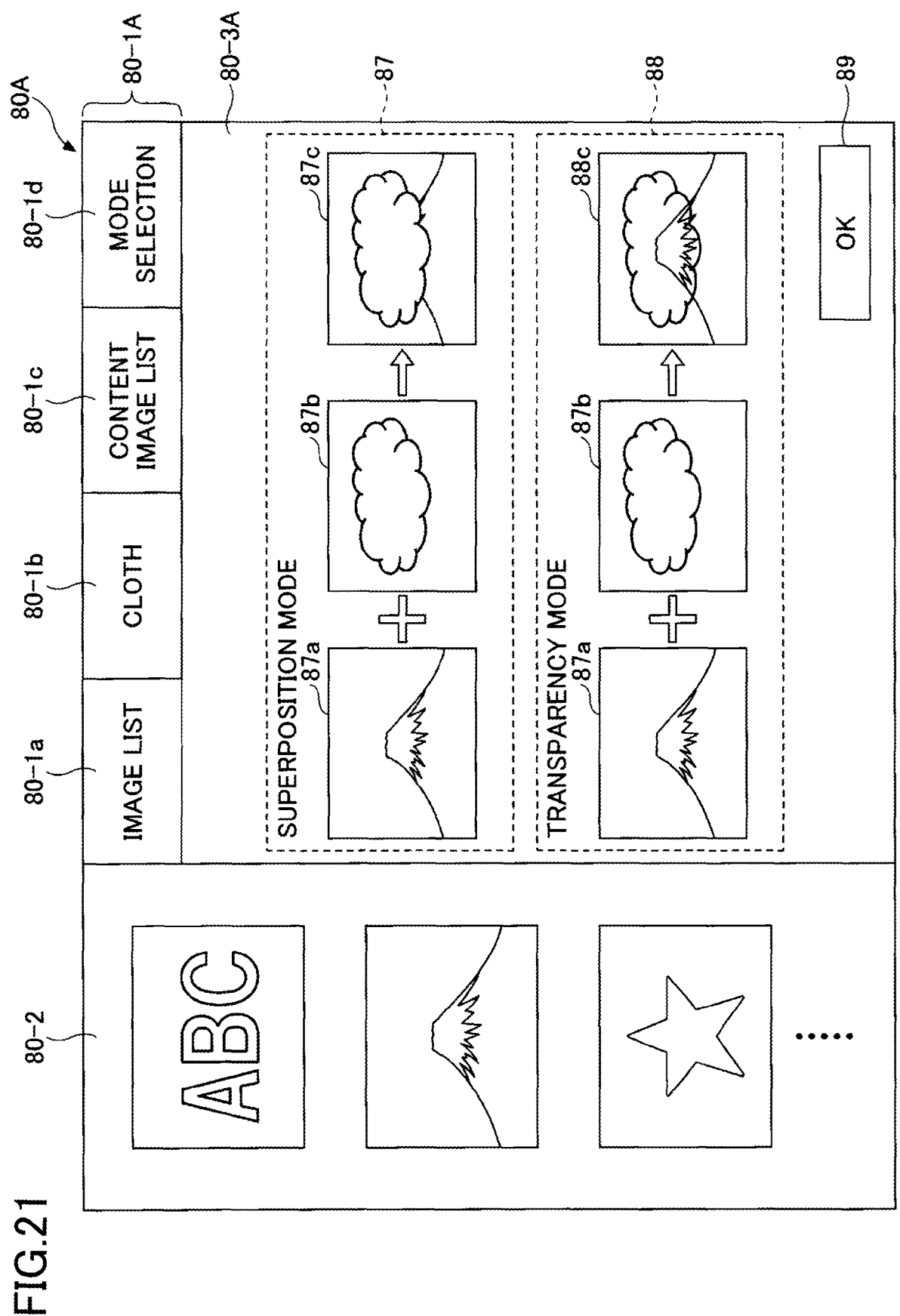
FIG. 21 is a diagram illustrating a display example of the terminal apparatus in the fourth embodiment.

In the following, a mode selection will be described with reference to FIG. 21. FIG. 21 is a diagram illustrating a display example of the terminal apparatus in the fourth embodiment.

A screen 80A illustrated in FIG. 21 is an example of the setting screen displayed in the terminal apparatus 300B in step S1907 of FIG. 19. More specifically, the display area 80-3A of the screen 80A is displayed after the positional relationship between the content image and the image is determined by the user.

A screen 80A in the fourth embodiment includes display areas 80-1A, 80-2, and 80-3A. The display area 80-1A of the screen 80A in the fourth embodiment is displayed with operation buttons 80-1*a*, 80-1*b*, 80-1*c*, 80-1*d*, and the like.

The operation button 80-1*d* is a button for allowing a user to select the superposition mode or the transparency mode.

When the operation button 80-1*d* is operated in the display area 80-1A of the screen 80A, an area 87 for selecting the superposition mode and an area 88 for selecting the transparency mode are displayed in the display area 80-3A.

In the screen 80A, for example, in the display areas 80-3A, when the area 87 for selecting the superposition mode is selected and an operation button 89 is operated, the superposition mode is selected. In the screen 80A, for example, in the display areas 80-3A, when the area 88 for selecting the superposition mode is selected and the operation button 89 is operated, the transparency mode is selected.

In the fourth embodiment, the area 87 displays a combination image 87*c* (preview image) when the selected image is combined with a content image 87*b*, which is an example of the selected content image, in the superposition mode.

A combination image 88*c* (preview image) in which an image 87*a* and the content image 87*b* are combined in the transparency mode is displayed in the area 88.

It is understood that the combination image 87*c* is an image in which an element in the content image 87*b* is superimposed on the image 87*a*, while the combination image 88*c* is displayed so that the image 87*a* is visible inside a shape of the element in the content image 87*b*.

As described above, in the fourth embodiment, it is possible for the user to select a method for superimposing an image represented by image data stored in the terminal apparatus 300C with a content image represented by content image data.

In the example of FIG. 21, in the display area 80-3A, the transparency mode or the superposition mode is selected after a positional relationship between an image and an content image is determined; however, a mode selection timing is not limited to this manner. A selection of the transparency mode or the superposition mode may be performed before the positional relationship between the image and the content image is determined.

According to the fourth embodiment, for example, in a case in which the information processing apparatus 200C refers to the content image DB 210A-1 (FIG. 10B), when the content image data whose value of the item "TRANSPARENCY" is "NO" is selected, the transparency mode may not be selected on the screen 80A.

Specifically, when the content image data whose value of the item "TRANSPARENCY" is "NO" is selected, the area 88 in the screen 80A may be grayed out to indicate that the transparency mode is not selectable.

In addition, even if a display are of a selection area for selecting one of the transparency mode and the superposition mode is formed to be pulled down by selecting the display area 80-1c, in a case of selecting the content image data whose value of the item "TRANSPARENCY" is "NO", the selection area is displayed in a state in which the transparency mode is not selectable.

In the fourth embodiment, it is possible to select the transparency mode or the superposition mode by referring to whether or not the content image data is to be transparent. Accordingly, in the fourth embodiment, for example, it is possible for an author of the content image data to specify a manner of use of the content image data by a user.

Fifth Embodiment

A fifth embodiment will be described below with reference to the drawings. The fifth embodiment is different from the first embodiment in that an element is edited. Accordingly, in the following in the fifth embodiment, only differences from the first embodiment will be described. Components having the same functional configurations as those in the first embodiment are denoted with the same reference numerals as those used in the description of the first embodiment, and thus, explanations thereof will be omitted.

Figure 22:
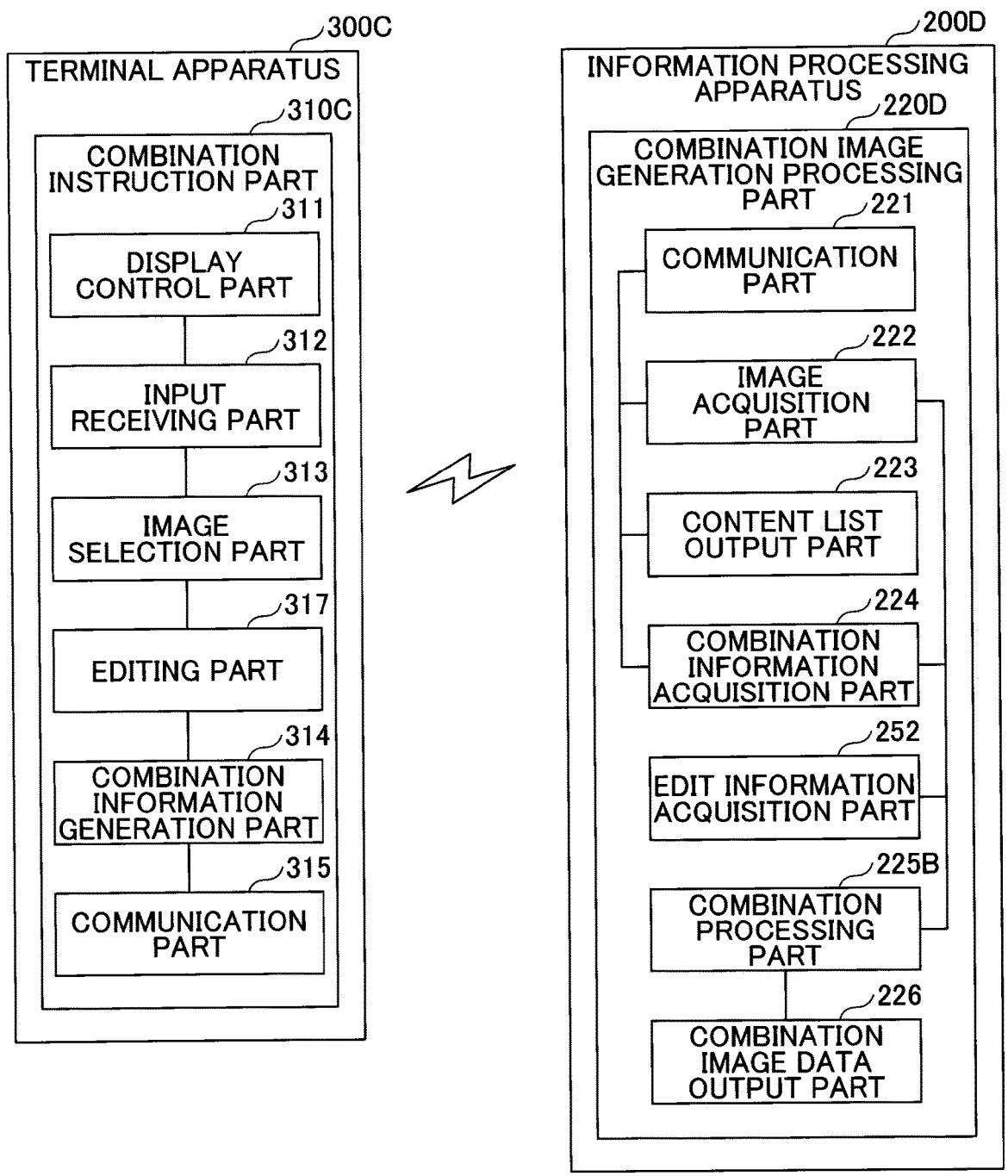
FIG. 22 is a diagram illustrating functions of an information processing apparatus and a terminal apparatus in a fifth embodiment.

FIG. 22 is a diagram illustrating functions of an information processing apparatus and a terminal apparatus in the fifth embodiment.

An information processing apparatus 200D in the fifth embodiment includes a communication part 221, an image acquisition part 222, a content list output part 223, a combination information acquisition part 224, a combination processing part 225B, a combination image data output part 226, and an edit information acquisition part 252.

The edit information acquisition part 252 in the fifth embodiment acquires edit information sent from the terminal apparatus 300C. The combination processing part 225B generates combined image data by using content image data edited based on the edit information and the image data.

A combination instruction part 310C of the terminal apparatus 300C in the fifth embodiment includes a display control part 311, an input receiving part 312, an image selection part 313, a combination information generation part 314, a communication part 315, and an editing part 317.

In a case in which an element extracted from the content image data is text, the editing part 317 performs predetermined editing on the element, and displays the content image data including the edited element. Also, the editing part 317 generates edit information indicating an edit method of the element.

Specifically, in a case in which the element is a text such as a letter or a numeral, the editing part 317 changes a width or font type of the letter or numeral to a predetermined width or font type.

The predetermined width or font type may be, for example, a width or font type, which are set in advance by a user of the terminal apparatus 300C. The predetermined width or font type may be, for example, the width or font type set in advance by an administrator of an information processing system in the fifth embodiment.

The editing part 317 in the fifth embodiment generates, for example, information representing the width or font type of an edited letter or numeral as edit information.

Figure 23:
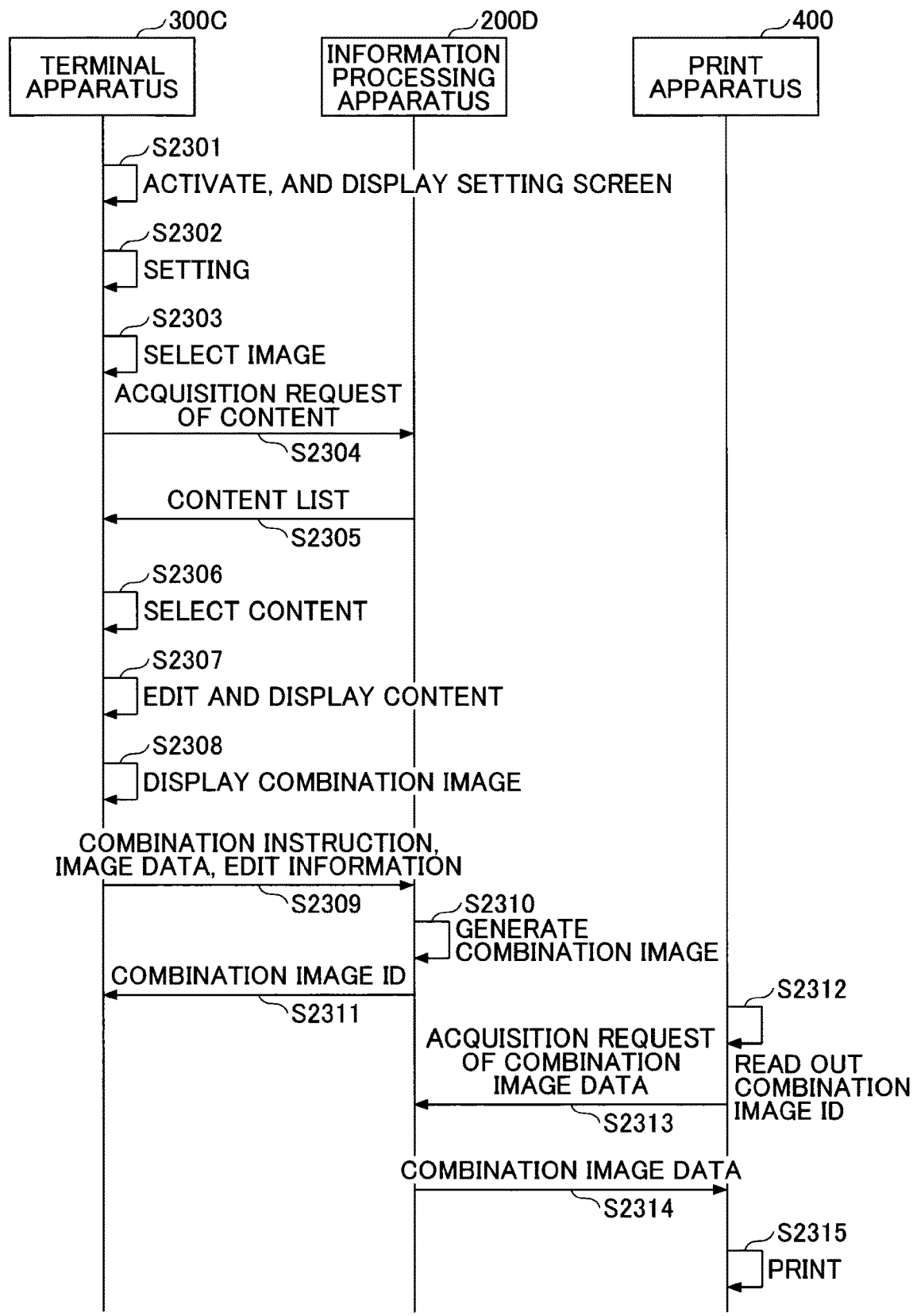
FIG. 23 is a sequence diagram illustrating an operation of an information processing system in the fifth embodiment.

In the following, referring to FIG. 23, an operation of the information processing system in the fifth embodiment will be described with reference to FIG. 23. FIG. 23 is a sequence diagram illustrating an operation of the information processing system in the fifth embodiment.

Because processes from step S2301 to step S2306 of FIG. 23 are the same as processes from step S501 to step S506 of FIG. 5, explanations thereof will be omitted.

In a case in which the content image data are selected in step S2306, when the element extracted from the content image data is text by the editing part 317, the combination instruction part 310C of the terminal apparatus 300C generates the edit information by editing the element (step S2307).

In the fifth embodiment, an editing process is performed on the content image data selected from a list of sets of the content image data; however, the editing process is not limited to this manner.

In the fifth embodiment, for example, the setting screen displayed in step S2301 may include an area for entering text, and the text entered in the area may be edited as an element.

Subsequently, the terminal apparatus 300C displays a preview image, in which the content image containing the edited element and the image represented by the image data selected in step S503 are combined according to operations of the user (step S2308).

Subsequently, when a positional relationship between the content image and the image is determined by the user, the terminal apparatus 300C generates combination information including information indicating the positional relationship between the content image and the image by the combination information generation part 314, and sends the combination information together with the selected image data and the edit information to the information processing apparatus 200 as the combination instruction (step S2309). At this time, in a case in which the element is the text input at the terminal apparatus 300C, the terminal apparatus 300C sends text data representing the text to the information processing apparatus 200D.

When receiving a combination instruction and image data from the terminal apparatus 300C, the information processing apparatus 200D edits the content image data according to the edit information by the combination processing part 225B, and generates combination image data, in which the edited content image and the image indicated by the image data are superimposed based on the combination information. Details of step S2310 will be described below.

Because processes from step S2311 to step S2315 of FIG. 23 are the same as processes from step S510 to step S514 of FIG. 5, explanations thereof will be omitted.

Figure 24:
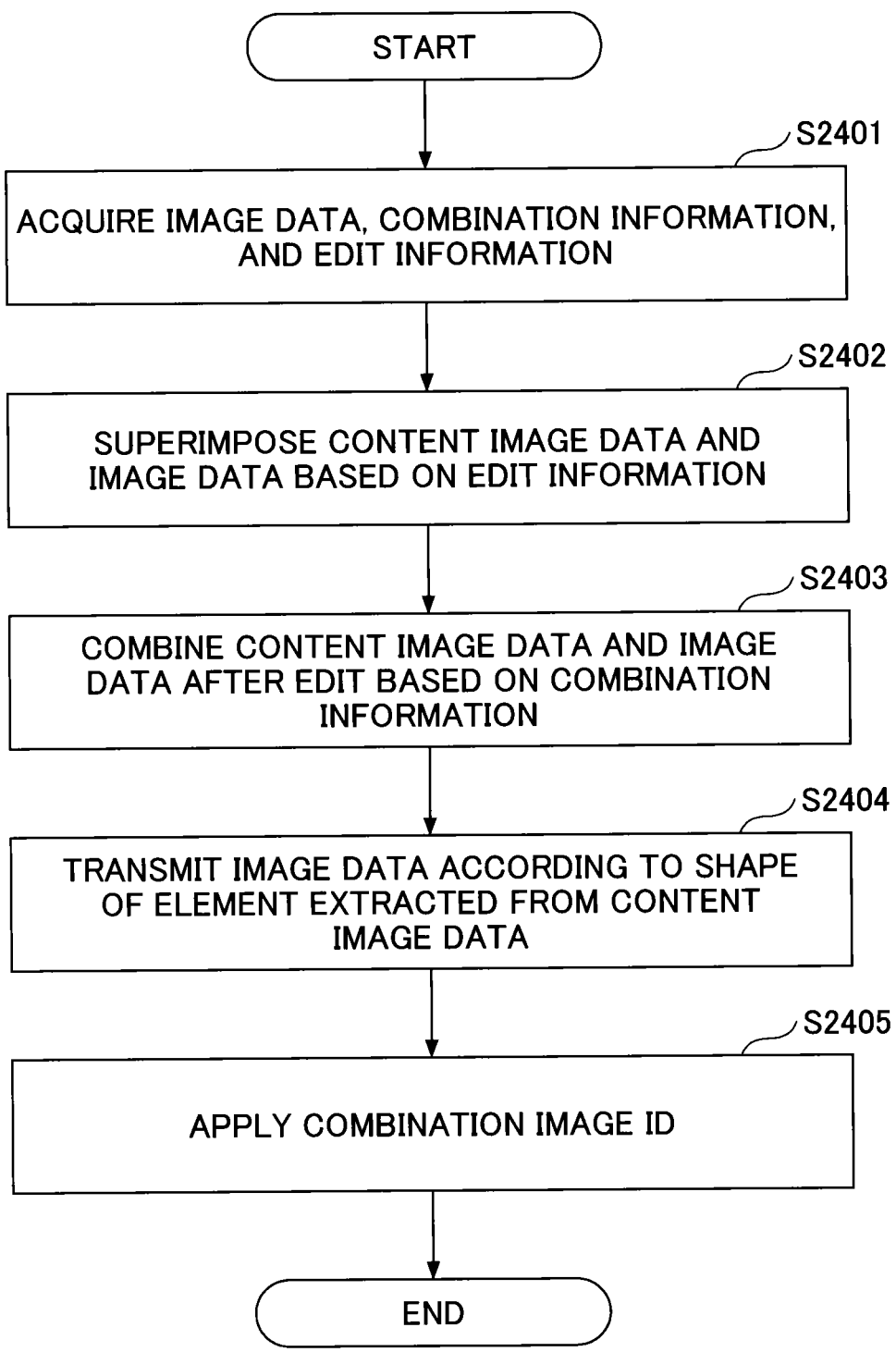
FIG. 24 is a diagram for explaining a process for generating combination image data in the fifth embodiment.

Next, a process of the combination processing part 225B of the information processing apparatus 200D in the fifth embodiment will be described with reference to FIG. 24. FIG. 24 is a diagram for explaining the process for generating the combination image data in the fifth embodiment. FIG. 24 illustrates details of a process of step S2310 of FIG. 23.

The process of FIG. 24 represents an operation of the information processing apparatus 200D in a case in which the element is a text and the editing process is performed on the element. The operation of the information processing apparatus 200D in a case in which the element is not text is the same as the operation of the information processing apparatus 200 in the first embodiment.

The combination image generation processing part 220D in the fifth embodiment acquires the image data, which are received from the terminal apparatus 300C, by the image acquisition part 222, acquires the combination information, which are received from the terminal apparatus 300C, by the combination information acquisition part 224, and acquires edit information by the edit information acquisition part 252.

Subsequently, the combination image generation processing part 220D edits the selected content image data based on the edit information by the combination processing part 225B (step S2402).

Subsequently, the combination image generation processing part 220D combines the content image data and the image data by the combination image generation processing part 225B so as to form a position relationship between the edited content image and the image data represented by the image data received from the terminal apparatus 300C (step S2403).

Because processes of step S2404 and step S2405 in FIG. 24 are the same as processes of step S603 and step S604 in FIG. 6, explanations thereof will be omitted.

Figure 25:
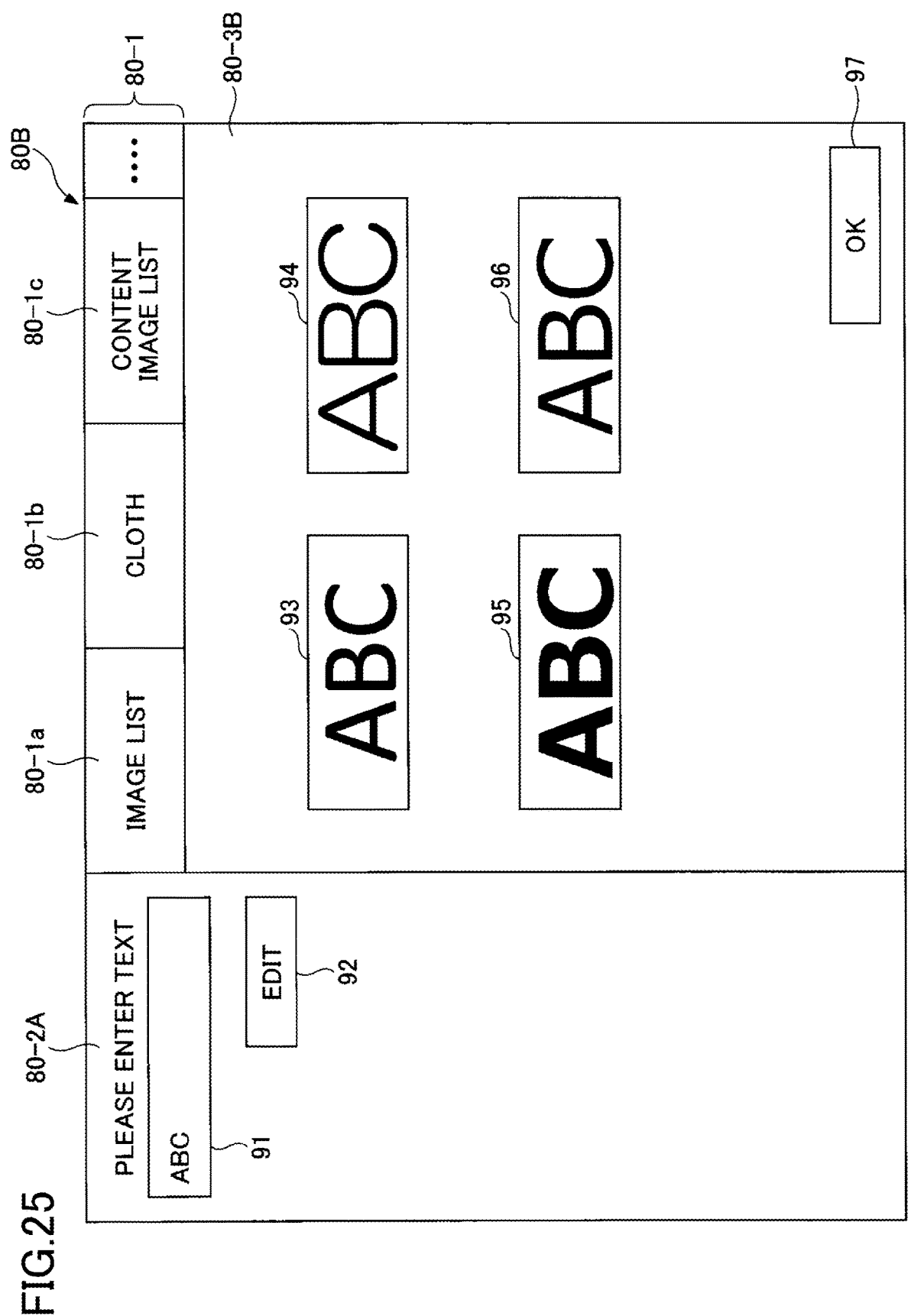
FIG. 25 is a diagram illustrating a display example of the terminal apparatus in the fifth embodiment.

In the following, a setting screen in the fifth embodiment will be described with reference to FIG. 25. FIG. 25 is a diagram illustrating a display example of the terminal apparatus in the fifth embodiment.

A screen 80B depicted in FIG. 25 is an example of a setting screen displayed on the terminal apparatus 300C in step S2301 of FIG. 23.

A screen 80B in the fifth embodiment includes display areas 80-1, 80-2A, 80-3B. In the display area 80-2A of the screen 80B in the fifth embodiment, for example, an input area 91 and an operation button 92 for editing an entered text data are displayed.

In the display area 80-3B in the fifth embodiment, in a case in which text is entered into the input area 91 and the operation button 92 is manipulated, an edited image showing the text is displayed.

Note that text entered in the input area 91 is a letter or a string, and an image representing text is a text image representing the letter or the string. In the following, the image representing text may be referred to as text image.

In the fifth embodiment, an edited text image, in which the text image representing the entered text is determined as an element.

The example of FIG. 25 illustrates a case in which a text "ABC" has been entered in the input area 91. When the text "ABC" is entered in the input area 91, and the operation button 92 is operated, the editing part 317 edits a text image representing the text "ABC".

In the display area 80-3B of FIG. 25, content images 93, 94, 95, and 96 including the edited text image are displayed. For example, the content images 93 through 96 are regarded as candidates of a content image to be combined with an image represented by image data stored in the terminal apparatus 300C.

For example, the content image 93 includes a text image, in which the text "ABC" is drawn in a font type "Calibri", and the content image 94 includes a text image, in which the text "ABC" is drawn in a font type "HG Marugoshic M-PRO". For example, the content image 95 includes a text image, in which the text "ABC" is drawn in bold form of "Meiryo UI", and the content image 96 includes a text image, in which the text "ABC" is drawn in a font type "Meiryo UI".

Font types may not be limited to the font types described above, and the content image 96 may be a text image using another font type. The font type to be used may also be changed depending on a region. For example, in Japan, a font type such as Otsuka Gothic pro H or the like may be used.

Each of the text images included in the content images 93 through 96 is an edited text image, in which a text image of the text "ABC" is edited by the editing part 317. In other words, the text images included in the content images 93 through 96 are regarded as edited elements included in the content images.

In the fifth embodiment, for example, when any one of the content images 93 through 96 is selected in the display area 80-3B and the operation button 97 is operated, the selected content image is applied as a target of the combination process.

In the fifth embodiment, the editing part 317 may edit the text image such that a width of a text is drawn in a predetermined width. Specifically, it is preferable that the editing part 317 in the fifth embodiment edits the text image so that, for example, a width of a line of the text image is larger than approximately 2.5 cm.

In the following, a table indicates results from evaluating the width of the line of the text image and whether a visualized image is preferably viewed or not by the inventors. The evaluation was performed by changing the width of one line of the font type using a text image in Calibri font size of 360.

TABLE 1

| WIDTH OF LINE OF TEXT IMAGE | VISIBILITY |
| --- | --- |
| 0.5 cm | NOT VIEWED |
| 1.0 cm | NOT VIEWED |
| 1.7 cm | SLIGHTLY VIEWED |
| 2.0 cm | SLIGHTLY VIEWED |
| 2.5 cm | PREFERABLY VIEWED |
| 2.7 cm | PREFERABLY VIEWED |

The width may be set based on, for example, an area of the text image. The larger the area of the text image, the wider the transparent region corresponding to the shape of the element in a case in which the content image containing the text image is subject to the combination process.

The editing part 317 in the fifth embodiment may edit each of images representing respective letters included in the entered text to form consecutive images.

FIG. 26A and FIG. 26B are diagrams illustrating editing examples of a text image by the editing part. In FIG. 26A, a text image representing the text "ABC" depicts consecutive images of letters.

In FIG. 26B, a text image representing the text "ABC" is also formed by consecutive images of letters. However, the editing process is conducted to make an area of the text image wider then an area of the text image depicted in FIG. 26A.

In the fifth embodiment, the text image is edited by the editing part 317; however, the editing process is not limited to this manner. The text image may be edited by an operation of the user.

Specifically, for example, the user may perform an operation for editing the text image with respect to the content images 93 through 96 displayed in the display area 80-3B of the screen 80B. In this case, for example, images of letters "A", "B", and "C" may be moved individually, or a width and a font type may be defined for each of the letters.

As described above, in the fifth embodiment, in a case in which an element is a text, it is possible to edit a width and a font type of a text image representing a text to create various patterns of text images and to display the various patterns to a user of the terminal apparatus 300C. In other words, in the fifth embodiment, in a case in which an element included in a content image is a text image, a width and a font type of the text image are edited to create various patterns of text images.

Sixth Embodiment

A sixth embodiment will be described with reference to the drawings. The sixth embodiment is different from the first embodiment in that sets of image data acquired from a terminal apparatus are combined with each other. Accordingly, in the following in the sixth embodiment, only differences from the first embodiment will be described. Components having the same functional configurations as those in the first embodiment are denoted with the same reference numerals as those used in the description of the first embodiment, and thus, explanations thereof will be omitted.

FIG. 27 is a diagram illustrating functions of an information processing apparatus and a terminal apparatus in the sixth embodiment.

A combination image generation processing part 220E of the information processing apparatus 200E in the sixth embodiment includes a communication part 221, an image acquisition part 222, a content list output part 223, a combination information acquisition part 224, a combination processing part 225C, and a combination image data output part 226.

The combination processing part 225C combines two sets of image data received from a terminal apparatus 300D. More specifically, the combination processing part 225C generates combination image data by visualizing one set of image data in accordance with a shape of an element of another set of image data among the two sets of image data selected at the terminal apparatus 300D.

A combination instruction part 310D of the terminal apparatus 300D in the sixth embodiment includes a display control part 311, an input receiving part 312, an image selection part 313, a combination information generation part 314, a communication part 315, and an element specification part 318.

The element specification part 318 in the sixth embodiment performs a process such as an edge detection with respect to the image data selected by the image selection part 313, and specifies an element in an image based on a shape extracted from the image data. In addition, in response to specifying the element based on the image data, the element specification part 318 may generate shape image data for drawing the element based on the image data.

Moreover, when the element specification part 318 performs the edge detection or the like, and a plurality of elements is detected from the image data based on a line representing the edge, the element specification part 318 may allow a user to select an element used for the combination process from among the plurality of elements. In this case, the shape image data may be generated only for the element selected for use in the combination process.

Figure 28:
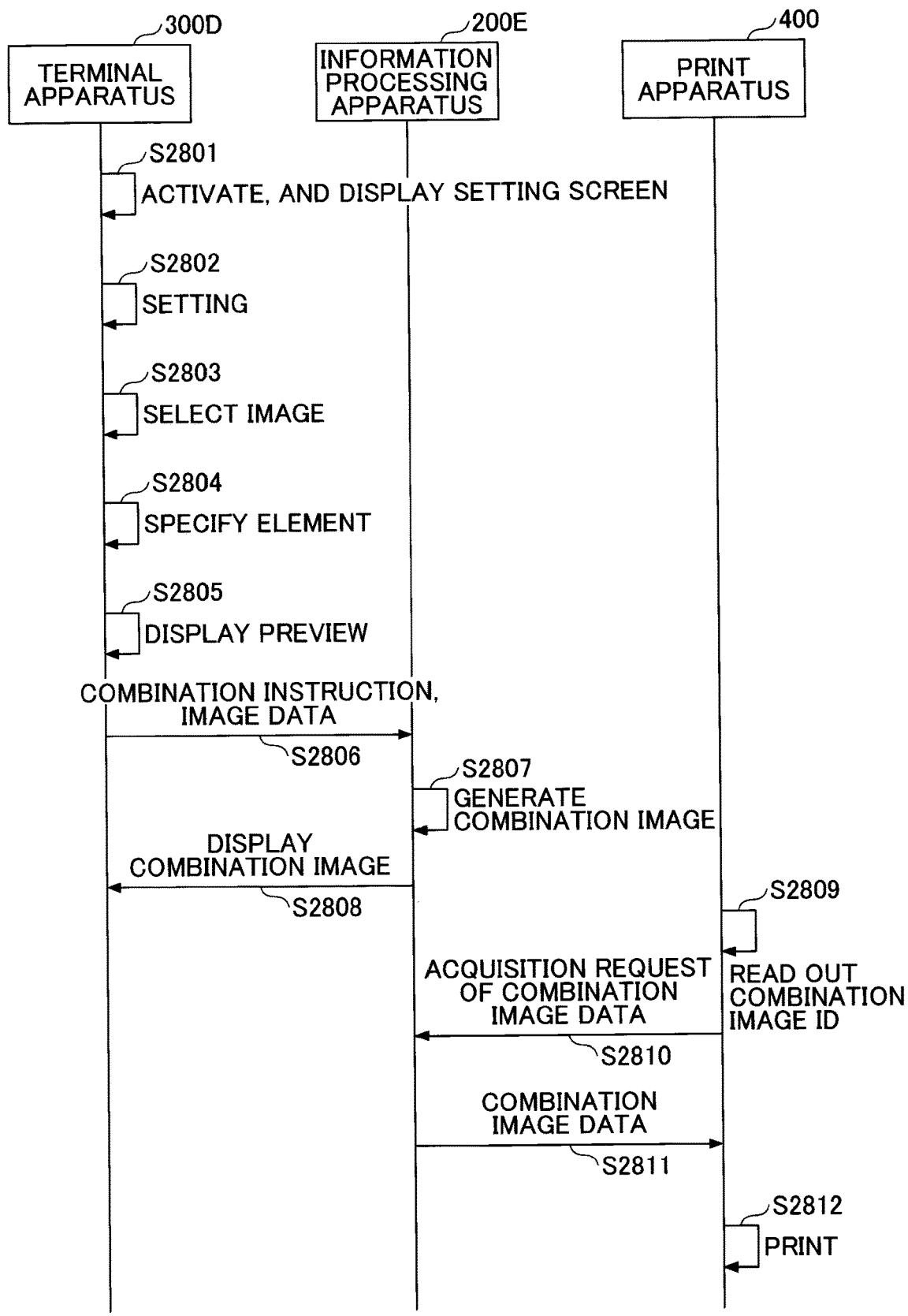
FIG. 28 is a sequence diagram illustrating an operation of an information processing system in the sixth embodiment.

Next, an operation in an information processing system in the sixth embodiment will be described. FIG. 28 is a sequence diagram illustrating an operation of the information processing system in the sixth embodiment.

Because processes of step S2801 and step S2802 in FIG. 28 are similar to processes of step S501 and step S502 in FIG. 5, explanations thereof will be omitted.

Following step S2802, the terminal apparatus 300D receives, by the input receiving part 312, a selection of a plurality of sets of image data to be combined together (step S2803).

Subsequently, the terminal apparatus 300D specifies, by the element specification part 318, elements included in the image from a plurality of sets of selected image data (step S2804). At this time, the element specification part 318 may generate shape image data.

In the sixth embodiment, for example, in a case in which a set of image data specifying an element is selected by a user from among the plurality of image data selected in step S2803, a process of specifying an element may be performed with respect to the image data.

Moreover, in the sixth embodiment, the process of specifying an element may be performed with respect to all of the plurality of image data selected in step S2803.

Subsequently, the terminal apparatus 300D displays, by the display control part 311, a preview image, in which a plurality of sets of image data selected in step S2803 are combined according to operations of the user (step S2805).

For example, in step S2803, when two sets of image data are selected and shape image data is generated from one set of image data, another set of image data and the shape image data may be combined, and a preview image may be displayed.

Subsequently, the terminal apparatus 300D sends, by the communication part 315, the selected image data and the combination information to an information processing apparatus 200E together with the combination instruction (step S2806). For example, the communication section 315 may send the shape image data generated from one set of image data, another set of image data, and the combination information as a combination instruction to the information processing apparatus 200E.

Because processes from step S2807 to step S2812 in FIG. 28 are the same as processes from step S509 to step S514 in FIG. 5, explanations thereof will be omitted.

Figure 29:
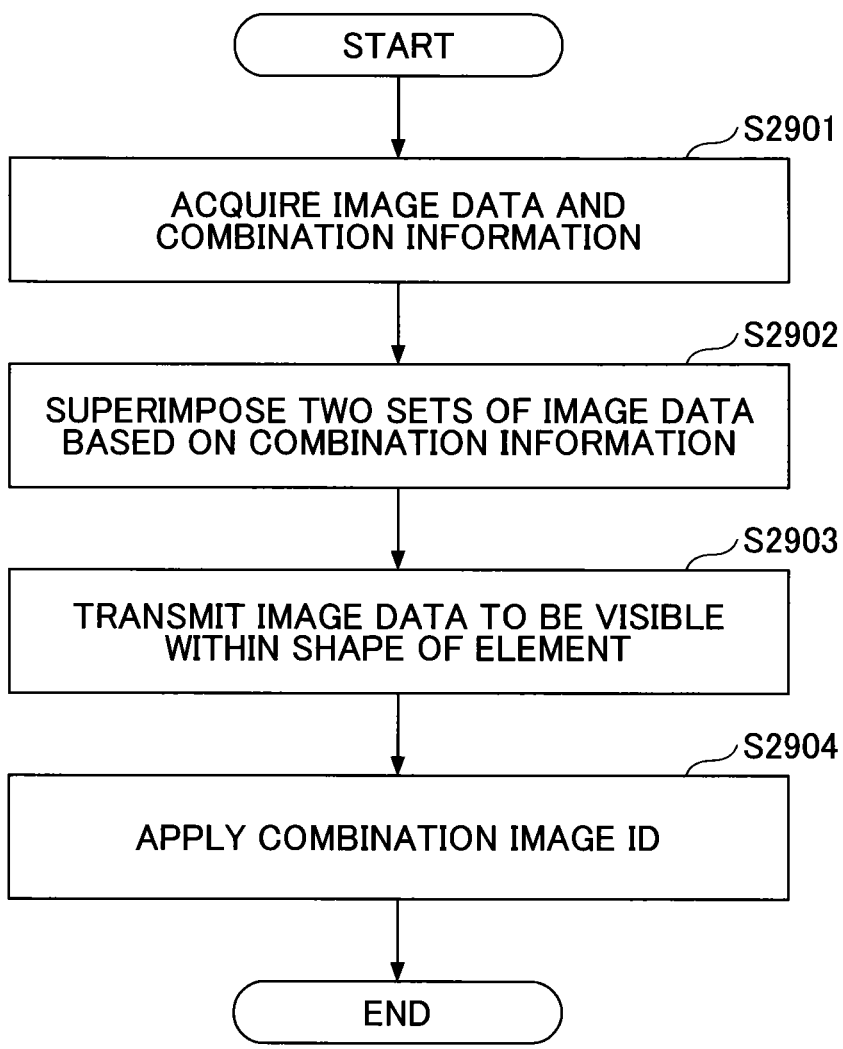
FIG. 29 is a diagram for explaining a process for generating combination image data in the sixth embodiment.

Next, a process of the combination processing part 225C of the information processing apparatus 200E in the sixth embodiment will be described with reference to FIG. 29. FIG. 29 is a diagram for explaining a process for generating the combination image data in the sixth embodiment. FIG. 29 illustrates details of a process of step S2807 of FIG. 28.

The combination processing part 225C in the sixth embodiment receives sets of image data selected in step S2803 and the combination information from the terminal apparatus 300D (step S2901). Subsequently, the combination processing part 225C superimposes the sets of received image data with each other based on the combination information. Specifically, the combination processing part 225C may superimpose the shape image data on the sets of received image data.

Subsequently, the combination processing part 225C generates the combination image data, in which a lower layer image is able to be viewed inside a shape of an element represented by the shape image data (step S2903).

Subsequently, the combination processing part 225C applies a combination image ID as identification information in order to specify the combination image data generated in step S2903 (step S2904), and terminates this process.

Figure 30:
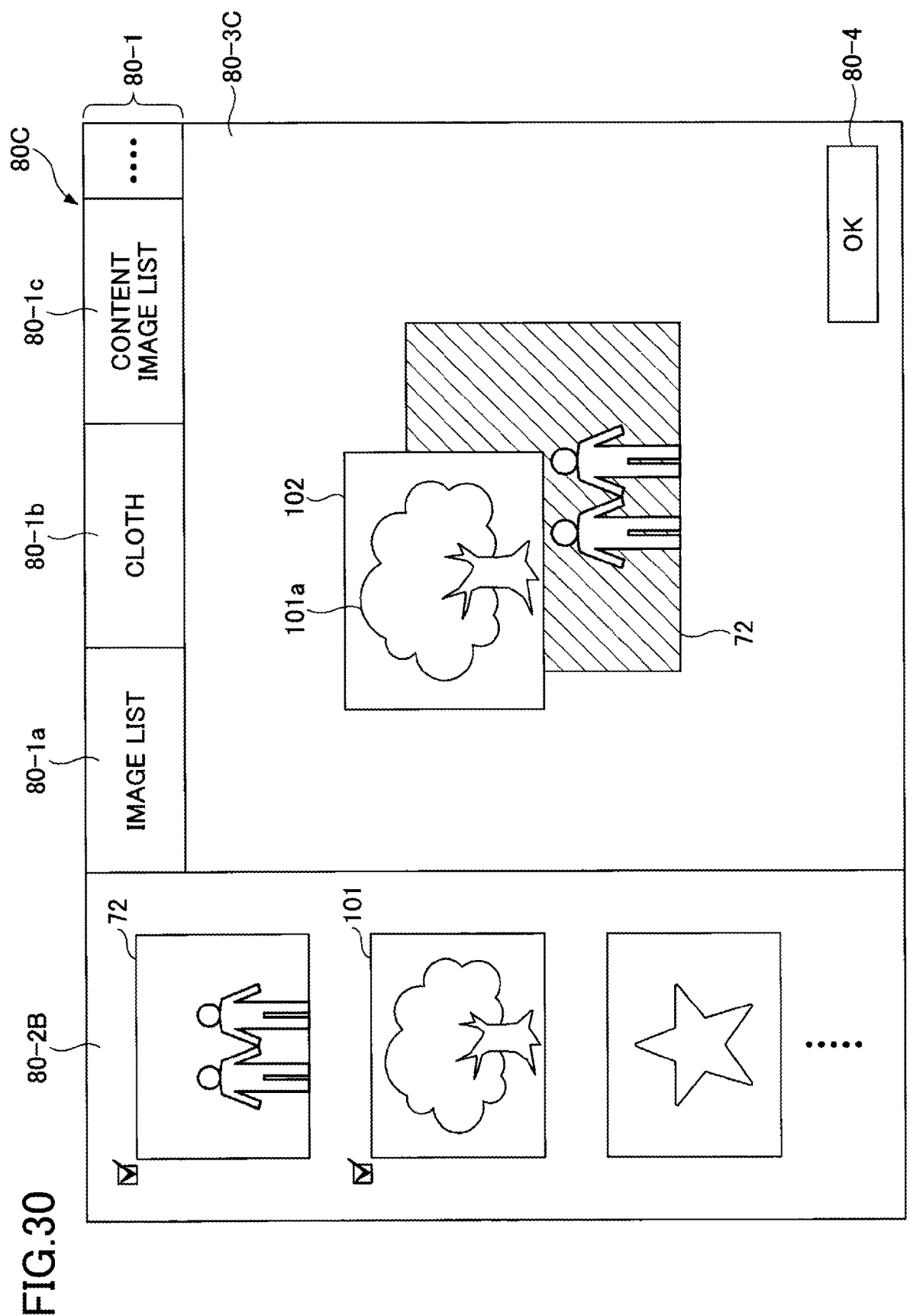
FIG. 30 is a diagram illustrating a display example of the terminal apparatus in the sixth embodiment.

Next, a setting screen in the sixth embodiment will be described with reference to FIG. 30. FIG. 30 is a diagram illustrating a display example of a terminal apparatus in the sixth embodiment.

A screen 80C depicted in FIG. 30 is an example of a setting screen displayed on the terminal apparatus 300D in the step S2801 of FIG. 28.

The screen 80C in the sixth embodiment includes display areas 80-1, 80-2B, and 80-3C. A list of sets of image data stored in the terminal apparatus 300D, for example, is displayed in a display area 80-2C of the screen 80C in the sixth embodiment. Specifically, for example, a list of the image data captured by an imaging device of the terminal apparatus 300D may be displayed in the display area 80-2C. In the example of FIG. 30, the list of sets of image data is displayed as a list of thumbnail images.

The display area 80-3C displays an image represented by the selected image data in the display area 80-2B.

In FIG. 30, the display area 80-2B displays a state, in which the image 72 and the image 101 are selected and a process by the element specification part 318 is performed on the image 101.

The display areas 80-3C displays a shape image 102 represented by shape image data representing a shape of an element 101a specified in the image 101, and displays the image 72. The shape image 102 and the image 72 are superimposed by an operation of the user.

In the sixth embodiment, when the operation buttons 80-4 are operated after the operation of the user, image data representing the image 72 displayed in the display area 80-3C, the shape image data representing the shape image 102, and the combination information are sent to the information processing apparatus 200E.

As described above, according to the sixth embodiment, it is possible to define any image desired by the user as an image having any shape without using content image data prepared in advance.

In the above-described embodiments, the information processing apparatus 200, and 200A through 200E include the combination image generating processing part 220, and 220A through 220E, respectively; however each functional configuration of the information processing apparatus 200, and 200A through 200E is not limited to this functional configuration. A modification of the information processing system will be described with reference to FIG. 31. FIG. 31 is a diagram illustrating the modification embodiment of an information processing system.

In the information processing system illustrated in FIG. 31, an information processing apparatus 200F includes a content image DB 210, and a terminal apparatus 300E includes a combination image generation processing part 220 and a combination instruction part 310.

In the information processing system illustrated in FIG. 31, because generation of the combination image data is completed in the terminal apparatus 300E, it is possible to reduce a load of communication between the terminal apparatus 300E and the information processing apparatus 200F.

In the example of FIG. 31, because the combination image data generated by the terminal apparatus 300E may be directly sent from the terminal apparatus 300E to the print apparatus 400, it is possible to print out the combination image data without using the information processing apparatus 200F.

Although the invention has been described in accordance with the embodiments, the invention is not limited to the requirements shown in the embodiments. In these respects, the subject matter of the present invention may be varied without prejudice and may be suitably defined according to its application.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, a hard disk, a CD ROM, a magnetic tape device or a solid state memory device.

The hardware platform includes any desired hardware resources including, for example, a processor such as a central processing unit (CPU), a random access memory (RAM), and a hard disk drive (HDD). The CPU may be implemented by any desired number of processors. The RAM may be implemented by any desired volatile or non-volatile memory. The HDD may be implemented by any desired non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on and claims benefit of priority of Japanese Priority Patent Applications No. 2018-216044 filed on Nov. 16, 2018, and No. 2019-205610 filed on Nov. 13, 2019, the entire contents of which are hereby incorporated by reference.

REFERENCE SIGNS LIST 100, 100A information processing system
200, 200A to 200F information processing apparatus
210 content image DB
210A image DB
220, 220A to 220E combination image generation processing part
221 communication part
222 image acquisition part
222A image acquisition part
223 content list output section
223A content selection part
224 combination information acquisition part
225 combination processing part
226 combination image data output part
227 metadata extraction part
228 charge determination part
229 charge history storage part
230 image accumulation part
231 image selection part
251 mode determination part 252 edit information acquisition part
300, 300A to 300E terminal apparatus
310 combination instruction part

The invention claimed is:

1. An information processing system, comprising:
a terminal apparatus; and
an information processing apparatus,
wherein the information processing apparatus performs a first process including
storing first image data in a first storage device,
receiving second image data from the terminal apparatus,
generating third image data representing a third image for displaying a part of a second image represented by second image data in a region inside or outside a shape of an element included in a first image represented by the first image data, and
outputting the third image data to an output apparatus,
wherein the terminal apparatus performs a second process including
receiving an input from a user,
storing the second image data in a second storage device, and
sending the second image data to the information processing apparatus, and
wherein the element is a letter with a line width of 2.5 cm or more.

2. The information processing system as claimed in claim 1, wherein the third image is an image representing at least the part of the second image in the region inside the shape of the element.

3. The information processing system as claimed in claim 1, wherein the receiving of the input includes receiving a selection for conducting, in the generating of the third image data, one of
a first generation process that generates the third image, in which at least the part of the second image represented by the second image data is displayed in the region inside or outside the shape of the element included in the first image represented by the first image data, and
a second generation process other than the first generation process.

4. The information processing system as claimed in claim 3, wherein the second generation process generates the third image data, in which at least the part of the second image data displayed in the region by the first generation process is not displayed and at least another part of the second image is displayed in another region different from the region.

5. The information processing system as claimed in claim 1, wherein the first storage device stores
the first image data, and
information in association with the first image data, the information indicating whether or not to allow an execution of the first generation process that generates the third image data representing the third image, in which at least the part of the second image represented by the second image data is displayed in the region inside or outside the shape of the element included in the first image represented by the first image data.

6. The information processing system as claimed in claim 1, wherein the second process of the terminal apparatus further includes displaying at least one of the first image and the second image on a display device, and
wherein the receiving of the input receives an input of changing a position of the first image or the second image, and
the displaying causes the second image to be visible through the first image with a first transparency in a first region inside the element of the first image based on the input of changing the position of the first image or the second image, and causes the second image to be visible through the first image with a second transparency in a second region outside the element, the second transparency being different from the first transparency.

7. The information processing system as claimed in claim 1, further comprising an output apparatus,
wherein the first process of the information processing apparatus further includes outputting the third image data to the output apparatus,
wherein the output apparatus performs an image formation on a recording medium based on the third image data received from the information processing apparatus.

* * * * *